(12) United States Patent
Liu et al.

(10) Patent No.: US 12,326,944 B2
(45) Date of Patent: Jun. 10, 2025

(54) KEY FILLING METHOD, SYSTEM, AND APPARATUS, DEVICE, AND STORAGE MEDIUM

(71) Applicant: Tencent Technology (Shenzhen) Company Limited, Shenzhen (CN)

(72) Inventors: Junjian Liu, Shenzhen (CN); Weiming Yang, Shenzhen (CN); Dongqing Huang, Shenzhen (CN); Runzeng Guo, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 254 days.

(21) Appl. No.: 17/987,778

(22) Filed: Nov. 15, 2022

(65) Prior Publication Data

US 2023/0090351 A1    Mar. 23, 2023

Related U.S. Application Data

(63) Continuation of application No. PCT/CN2022/073859, filed on Jan. 25, 2022.

(30) Foreign Application Priority Data

Feb. 9, 2021   (CN) .......................... 202110181982.9

(51) Int. Cl.
*G06F 21/60*   (2013.01)
(52) U.S. Cl.
CPC ................... *G06F 21/602* (2013.01)
(58) Field of Classification Search
CPC ......... G06F 21/602; G06F 21/71; G06F 21/46
See application file for complete search history.

(56) References Cited

U.S. PATENT DOCUMENTS

2014/0359268 A1    12/2014  Jauhiainen et al.
2014/0365764 A1*   12/2014  Buer ................... G06Q 20/3674
                                                          713/168

(Continued)

FOREIGN PATENT DOCUMENTS

CN         108388152 A       8/2018
CN         110874296 A       3/2020

(Continued)

OTHER PUBLICATIONS

Tencent Technology, WO, PCT/CN2022/073859, Mar. 30, 2022, 5 pgs.

(Continued)

*Primary Examiner* — Sangseok Park
(74) *Attorney, Agent, or Firm* — Morgan, Lewis & Bockius LLP

(57) ABSTRACT

A key filling method includes transmitting first filling information to a server, the first filling information indicates to a security chip a filling permission of an electronic device; obtaining second filling information that includes a verification public key generated by the server. In accordance with a determination that the electronic device has the filling permission based on the first filling information, the second filling information comprises filling information transmitted by the server to the electronic device; and filling the verification public key into the security chip, the verification public key being used for encrypting information, and a verification private key corresponding to the verification public key being used for decrypting the encrypted information.

20 Claims, 8 Drawing Sheets

(56) References Cited

U.S. PATENT DOCUMENTS

| | | | |
|---|---|---|---|
| 2016/0028548 A1* | 1/2016 | Yao | H04L 9/3247 |
| | | | 713/176 |
| 2016/0232381 A1 | 8/2016 | Ju | |
| 2017/0063810 A1* | 3/2017 | Bruce | H04L 63/126 |
| 2018/0137295 A1 | 5/2018 | Sharma | |
| 2019/0312851 A1 | 10/2019 | Campagna et al. | |
| 2021/0203498 A1* | 7/2021 | Shin | H04L 9/083 |
| 2022/0253516 A1* | 8/2022 | Chung | G06F 21/32 |

FOREIGN PATENT DOCUMENTS

| | | | |
|---|---|---|---|
| CN | 112989370 A | | 6/2021 |
| KR | 20160098756 A | | 8/2016 |
| WO | WO 2007094035 A1 | | 8/2007 |

OTHER PUBLICATIONS

Tencent Technology, IPRP, PCT/CN2022/073859, Aug. 15, 2023, 6 pgs.
Tencent Technology, Japanese Office Action, JP Patent Application No. 2023-537408, May 31, 2024, 6 pgs.
Tencent Technology, ISR, PCT/CN2022/073859, Mar. 30, 2022, 2 pgs.
Tencent Technology, Extended European Search Report, EP Patent Application No. 22752134.1, Mar. 11, 2024, 8 pgs.
Tencent Technology, Indian Office Action, IN Patent Application No. 202337032207, Mar. 20, 2025, 6 pgs.

* cited by examiner

KEY FILLING METHOD, SYSTEM, AND APPARATUS, DEVICE, AND STORAGE MEDIUM

RELATED APPLICATION

This application is a continuation application of PCT Patent Application No. PCT/CN2022/073859, entitled "KEY FILLING METHOD, SYSTEM, AND APPARATUS, DEVICE, AND STORAGE MEDIUM" filed on Jan. 25, 2022, which claims priority to Chinese Patent Application No. 202110181982.9, entitled "KEY FILLING METHOD, SYSTEM, AND APPARATUS, DEVICE, AND STORAGE MEDIUM" filed on Feb. 9, 2021, which is incorporated by reference in its entirety.

FIELD OF THE TECHNOLOGY

This application relates to the field of data security, and in particular, to a key filling method, system, and apparatus, a device, and a storage medium.

BACKGROUND OF THE DISCLOSURE

With the development of network technologies, frequencies of information transmission become higher. Information transmitted in many scenarios is confidential information. Therefore, the information needs to be encrypted before information transmission, to ensure the security of the information.

SUMMARY

Embodiments of this application provide a key filling method, apparatus, and system, a device, and a storage medium. The technical solutions are as follows:

According to an aspect, a key filling method is provided, and is performed by an electronic device. The method includes:
  transmitting first filling information to a server, the first filling information indicates a filling permission to a security chip of the electronic device;
  obtaining second filling information, the second filling information including a verification public key generated by the server, in accordance with a determination that the electronic device has the filling permission to the security chip based on the first filling information, transmitting, by the server, the second filling information to the electronic device; and
  filling the verification public key into the security chip, the verification public key being used for encrypting information, and a verification private key corresponding to the verification public key being used for decrypting the encrypted information.

According to an aspect, a key filling method is provided, and is performed by a server. The method includes:
  obtaining first filling information transmitted by an electronic device, the first filling information being used for indicating a filling permission of the electronic device to a security chip; and
  transmitting second filling information to the electronic device in response to the electronic device having the filling permission to the security chip, the second filling information including a verification public key generated by the server so that the electronic device fills the verification public key into the security chip, the verification public key being used for encrypting information, and a verification private key corresponding to the verification public key being used for decrypting the encrypted information.

According to an aspect, a key filling method is provided, and is performed by a security chip. The method includes:
  obtaining a verification public key that is filled by an electronic device into the security chip, the verification public key being generated by a server, the verification public key being used for encrypting information, and a verification private key corresponding to the verification public key being used for decrypting the encrypted information; and
  encrypting transmitted information by using the verification public key.

According to an aspect, a key filling apparatus is provided, and includes:
  a first transmission module, configured to transmit first filling information to a server, the first filling information being used for indicating a filling permission of the electronic device to a security chip;
  a first obtaining module, configured to obtain second filling information, the second filling information including a verification public key generated by the server, in accordance with a determination that the electronic device has the filling permission to the security chip based on the first filling information, transmitting, by the server, the second filling information to the electronic device; and
  a filling module, configured to fill the verification public key into the security chip, the verification public key being used for encrypting information, and a verification private key corresponding to the verification public key being used for decrypting the encrypted information.

According to an aspect, a key filling apparatus is provided, and includes:
  a second obtaining module, configured to obtain first filling information transmitted by an electronic device, the first filling information being used for indicating a filling permission of the electronic device to a security chip; and
  a second transmission module, configured to transmit second filling information to the electronic device in response to the electronic device having the filling permission to the security chip, the second filling information including a verification public key generated by the server so that the electronic device fills the verification public key into the security chip, the verification public key being used for encrypting information, and a verification private key corresponding to the verification public key being used for decrypting the encrypted information.

According to an aspect, a key filling apparatus is provided, and includes:
  a third obtaining module, configured to obtain a verification public key that is filled by an electronic device into the security chip, the verification public key being generated by a server, the verification public key being used for encrypting information, and a verification private key corresponding to the verification public key being used for decrypting the encrypted information; and
  a transmitted information encryption module, configured to encrypt transmitted information by using the verification public key.

According to an aspect, a key filling system is provided, and includes: a security chip, an electronic device, and a server;

the electronic device being configured to transmit first filling information to the server, the first filling information being used for indicating a filling permission of the electronic device to the security chip;

the server being configured to receive the first filling information, in accordance with a determination that the electronic device has the filling permission to the security chip based on the first filling information, transmitting, by the server, the second filling information to the electronic device the second filling information including a verification public key generated by the server; and the electronic device being further configured to receive the second filling information, and fill the verification public key into the security chip, the verification public key being used for encrypting information, and a verification private key corresponding to the verification public key being used for decrypting the encrypted information.

According to an aspect, a computer device is provided, including one or more processors and one or more memories, the one or more memories storing at least one computer program, the computer program being loaded and executed by the one or more processors to implement the key filling method.

According to an aspect, a computer-readable storage medium is provided, storing at least one computer program, the at least one computer program being loaded and executed by a processor to implement the key filling method.

According to an aspect, a computer program product or a computer program is provided, including program code, the program code being stored in a computer-readable storage medium, a processor of a computer device reading the program code from the computer-readable storage medium, and the processor executing the program code, to cause the computer device to perform the key filling method.

BRIEF DESCRIPTION OF THE DRAWINGS

To describe the technical solutions in embodiments of this application more clearly, the following briefly describes the accompanying drawings required for describing the embodiments. Apparently, the accompanying drawings in the following description show merely some embodiments of this application, and a person of ordinary skill in the art may derive other drawings from these accompanying drawings without creative efforts.

DESCRIPTION OF EMBODIMENTS

Figure 1:
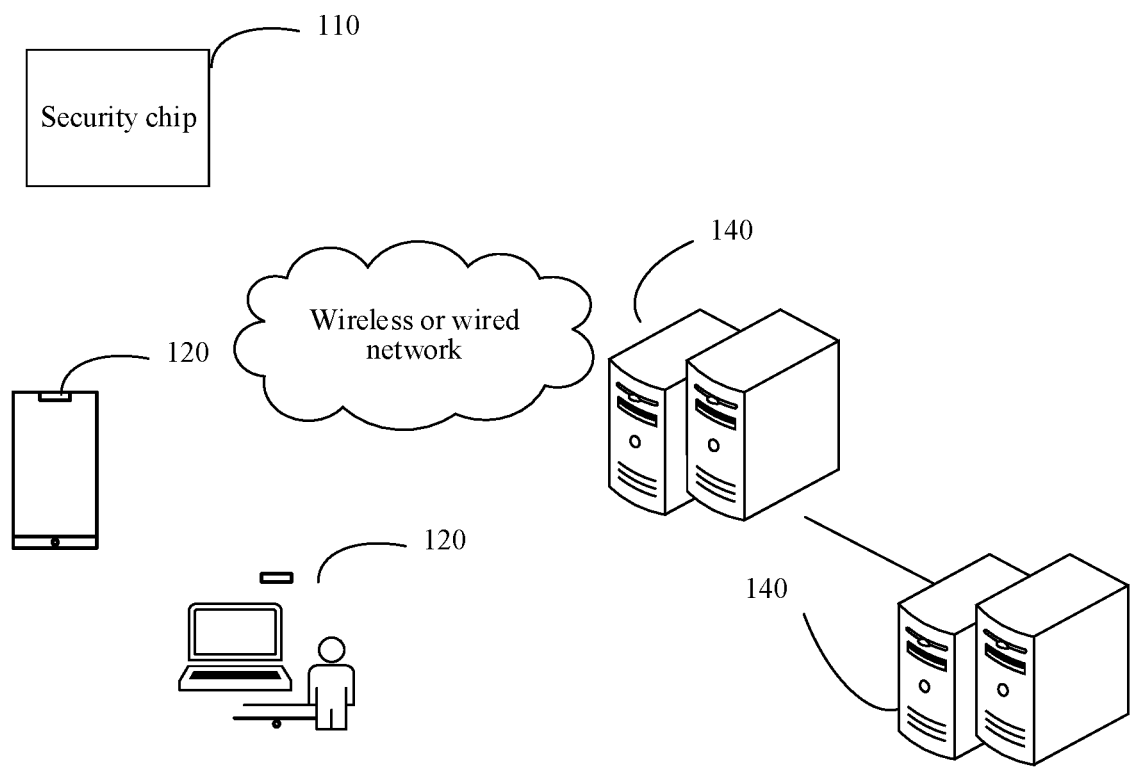
FIG. 1 is a schematic diagram of an implementation environment of a key filling method according to an embodiment of this application.

To make the objectives, technical solutions, and advantages of this application clearer, implementations of this application are further described below in detail with reference to the accompanying drawings.

The terms "first", "second", and the like in this application are used for distinguishing between same items or similar items of which effects and functions are basically the same. It should be understood that, the "first", "second", and "nth" do not have a dependency relationship in logic or time sequence, and a quantity and an execution order thereof are not limited.

In this application, the term "at least one" means one or more, and "a plurality of" means two or more.

In the related art, a user often encrypts information by using a security chip. In a process of encrypting information, the security chip encrypts the information by using a chip private key, and an information receiver decrypts the encrypted information through a chip public key, so as to complete the transmission of the information. During production of the security chip, the chip private key and the chip public key are often generated by the server, then the chip private key is delivered to an electronic device, and the electronic device fills the chip private key into the security chip.

However, the above chip filling process involves the transmission of the chip private key, and there is a risk of leakage of the chip private key, which reduces information security.

To describe the technical processes of the embodiments of this application, terms related in the embodiments of this application are described below.

A cloud technology is a collective name of a network technology, an information technology, an integration technology, a management platform technology, an application technology, and the like based on an application of a cloud computing business mode, and may form a resource pool. Usage is based on a requirement and is flexible and convenient. A cloud computing technology becomes an important support. A background service of a technical network system requires a large amount of computing and storage resources, such as a video website, an image website, and more portal websites.

A blockchain is a new application mode of computer technologies such as distributed data storage, point-to-point transmission, a consensus mechanism, and an encryption algorithm. The blockchain is essentially a decentralized database and is a string of data blocks generated through association by using a cryptographic method. Each data block includes information of a batch of network transactions, the information being used for verifying the validity of information of the data block (anti-counterfeiting) and generating a next data block. The blockchain may include an underlying blockchain platform, a platform product service layer, and an application service layer.

Symmetric encryption algorithm: an algorithm that uses same rules (keys) for encryption and decryption. That is, A selects a rule to encrypt information, and B uses the same rule (an inverse rule) to decrypt the information.

Asymmetric encryption algorithm: different rules can be used for encryption and decryption as long as there is some correspondence between the two rules. That is, B generates two keys (a public key and a private key) according to the algorithm, where the private key is confidential, and the public key is public for use of other persons who intend to communicate with B; A obtains the public key from B, and uses the public key to encrypt; and B uses the private key to decrypt after obtaining information encrypted by A, so as to complete the communication.

Coprime relationship: coprime is also referred to as relatively prime. If a greatest common divisor of two or more integers is 1, they are referred to as coprime. For example, for 7 and 10, a greatest common divisor thereof is 1. Therefore, they are relatively prime. For 8 and 10, a greatest common divisor thereof is 2. Therefore, they are not relatively prime.

Euler's function: for a positive integer n, solving a quantity of numbers that are relatively prime to n in positive integers less than or equal to n, which is denoted as $\varphi(n)$. For example, among 1 to 10, 1, 3, 7, and 9 form a coprime relationship with 10. Therefore, $\varphi(10)=4$.

Euler's theorem: also referred to as Fermat-Euler's theorem, and referring to that: if two positive integers a and n are relatively prime, a Euler function $\varphi(n)$ of n can make the following equation (1) true.

$$a^{\varphi(n)}=1(\bmod n) \quad (1)$$

where, mod is modulo, that is, a remainder of a $\varphi(n)$ power of a divided by n is 1, or the $\varphi(n)$ power of a minus 1, which is divisible by n. For example, for 7 and 5 that are relatively prime, $7^{\varphi(5)}-1=7^4-1=2401-1=2400$, which is divisible by 5.

RSA algorithm: an asymmetric encryption algorithm based on the Euler's function and the Euler's theorem above.

Security chip: a trusted platform module and an apparatus that can independently generate, encrypt, and decrypt keys. The security chip has an independent processor and storage unit inside, which can store keys and feature data, and provide encryption and security authentication services. By performing encryption by the security chip, the keys are stored in hardware, and stolen data cannot be decrypted, thereby protecting privacy and data security.

FIG. 1 is a schematic diagram of an implementation environment of a key filling method according to an embodiment of this application. Referring to FIG. 1, the implementation environment may include a security chip 110, an electronic device 120, and a server 140.

The electronic device 120 is connected to the security chip 110 by using a wireless network or a wired network model. In some embodiments, the electronic device 120 is a smartphone, a tablet computer, a laptop computer, a desktop computer, or the like, but is not limited thereto. In some embodiments, the electronic device 120 is a device used by a manufacturer of the security chip 110, and the electronic device 120 reads and writes the security chip 110 through a security chip card reader.

The electronic device 120 is connected to the server 140 by using a wireless network or a wired network. An application program supporting key filling is installed and run on the electronic device 120.

In some embodiments, the server 140 is an independent physical server, or is a server cluster or a distributed system formed by a plurality of physical servers, or is a cloud server that provides basic cloud computing services such as a cloud service, a cloud database, cloud computing, a cloud function, cloud storage, a network service, cloud communication, a middleware service, a domain name service, a security service, a content delivery network (CDN), big data, and an AI platform.

In some embodiments, the electronic device 120 generally refers to one of a plurality of electronic devices. In this embodiment of this application, the electronic device 120 is merely used as an example for description.

A person skilled in the art may learn that there may be more or fewer electronic devices. For example, there may be only one electronic device, or there may be dozens of or hundreds of or more electronic devices. In this case, another electronic device may be further included in the foregoing application environment. The quantity and the device type of the electronic devices are not limited in the embodiments of this application.

After the implementation environment of the embodiments of this application is described, the following describes application scenarios of the technical solutions provided in this embodiment of this application.

The technical solutions provided in this embodiment of this application can be applied in a scenario in which a merchant customizes a security chip. For example, a merchant intends to customize a stored value card, the stored value card carries a security chip, and the security chip is configured to encrypt information carried in the stored value card, so as to prevent the information in the stored value card from being tampered with, and avoid a situation in which the stored value card is stolen or additional information is written into the stored value card. The merchant can issue requirements to a manufacturer of the security chip, and the manufacturer of the security chip can customize the security chip based on the requirements of the merchant. The manufacturer of the security chip can perform key filling on the security chip by using the technical solutions provided in this embodiment of this application, and arrange the security chip after key filling on the stored value card of the merchant. In the process of key filling, a server used by the merchant to read the stored value card is the server 140 in the above implementation environment, and a device used by the manufacturer of the security chip to perform key filling on the security chip is also the above electronic device 120. After a user buys the stored value card of the merchant, the user can consume at the merchant through the stored value card with the security chip. During consumption, a change of the amount of the stored value card is encrypted by the security chip and stored in the stored value card, thereby preventing the stored value card from being stolen or preventing carried information from being rewritten.

The technical solutions provided in this embodiment of this application can be applied in a scenario of data encryption. For example, a manufacturer of a communication application intends to customize a security chip, and the security chip is configured to encrypt messages transmitted in the communication application, thereby preventing the messages transmitted in the communication application from being stolen. The manufacturer of the communication application can issue requirements to a manufacturer of the security chip, and the manufacturer of the security chip can customize the security chip based on the requirements of the manufacturer of the communication application. The manufacturer of the security chip can perform key filling on the security chip by using the technical solutions provided in this embodiment of this application, and arrange the security chip after key filling on a device on which the communication application is installed. In the process of key filling, a server used by the communication application is the server 140 in the above implementation environment, and a device used by the manufacturer of the security chip to perform key filling on the security chip is also the above electronic device 120. A user can use the communication application by using a device on which the security chip is installed, thereby preventing messages from being stolen.

In another example, this embodiment of this application can be applied to a blockchain system. Because the blockchain system includes a plurality of nodes, a mode of data transmission between the nodes is encryption transmission. Base on this, the security chip provided in this embodiment of this application can be used on the nodes on the blockchain system for encrypting and decrypting data, thereby ensuring the security of the data. In some embodiments, the nodes on the blockchain system are the electronic devices in the above implementation environment.

The introduction of the above application scenarios is only described by customizing the stored value card for the merchant and customizing the security chip for the communication application as examples. In other possible implementations, the key filling method provided in this embodiment of this application can also be applied in other security chip fabrication scenarios. This is not limited in the embodiments of this application.

To more clearly describe the technical solutions provided in this embodiment of this application, the following will describe by using the security chip, the electronic device, and the server in the above implementation environment as execution bodies.

Figure 2:
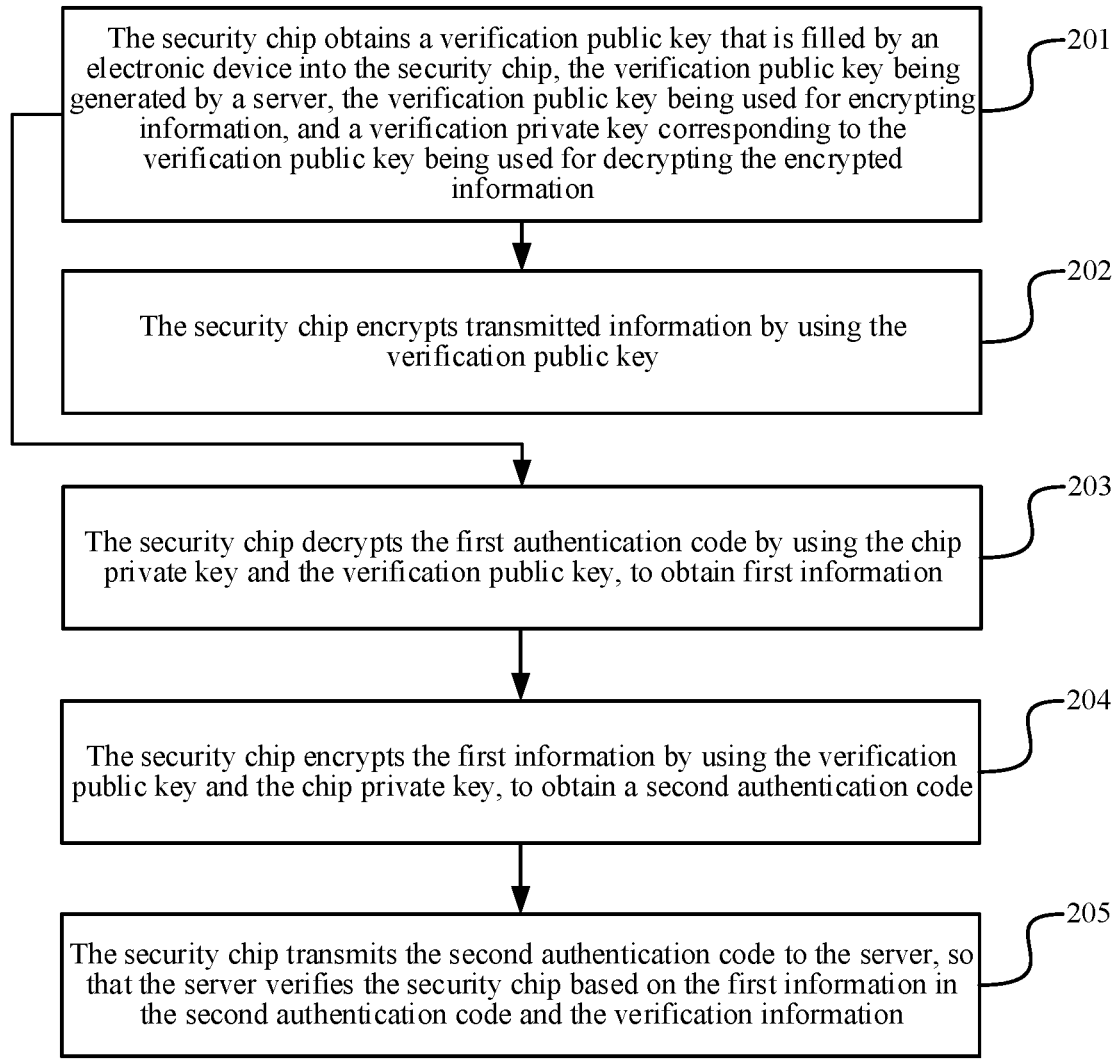
FIG. 2 is a flowchart of a key filling method according to an embodiment of this application.

FIG. 2 is a flowchart of a key filling method according to an embodiment of this application. Referring to FIG. 2, by using a security chip as an execution body, the method includes the following steps.

201. The security chip obtains a verification public key that is filled by an electronic device into the security chip, the verification public key being generated by a server, the verification public key being used for encrypting information, and a verification private key corresponding to the verification public key being used for decrypting the encrypted information.

The verification public key and the verification private key are an asymmetric encrypted key pair generated by the server.

In a possible implementation, in accordance with a determination that the electronic device has a filling permission to the security chip, the server transmits second filling information to the electronic device, and the electronic device transmits the verification public key in the second filling information to the security chip. The server is a server that is to use the security chip, such as a server of a merchant. The electronic device is a device used by a manufacturer manufacturing the security chip.

202. The security chip encrypts transmitted information by using the verification public key.

In a possible implementation, the security chip encrypts the transmitted information by using a chip private key of the security chip, to obtain first encrypted transmitted information. The security chip encrypts the first encrypted transmitted information by using the verification public key, to obtain second encrypted transmitted information, and transmits the second encrypted transmitted information to the server.

Through step 202, in a process of transmitting encrypted information, the security chip can encrypt information that needs to be transmitted by using the verification public key, to obtain encrypted information. In accordance with a determination that the encrypted information is received, the server can decrypt the encrypted information by using the verification private key corresponding to the verification public key, so as to realize confidential transmission of the transmitted information.

In some embodiments, in addition to the verification public key, the second filling information further includes a first authentication code obtained by the server encrypting verification information by using a chip public key of the security chip and the verification private key corresponding to the verification public key. After the second filling information is received, the electronic device can further transmit the first authentication code to the security chip. Correspondingly, after step 201, in addition to step 202, the security chip can also directly perform the following step 203 to step 205 to verify the filled verification public key based on the first authentication code.

203. The security chip decrypts the first authentication code by using the chip private key and the verification public key, to obtain first information.

In a possible implementation, the security chip decrypts the first authentication code by using the verification public key, to obtain a second verification code. The security chip decrypts the second verification code by using the chip private key, to obtain the first information.

Because the encryption and decryption processes are two corresponding processes, to describe the above implementations more clearly, the following first describes the process in which the server encrypts the verification information by using the chip public key and the verification private key to obtain the first authentication code.

In a possible implementation, the server encrypts the verification information by using the chip public key, to obtain a first verification code; and encrypts the first verification code by using the verification private key, to obtain the first authentication code.

For example, if the chip public key is $(n_1, d_1)$, for verification information $z_1$, the server encrypts the verification information through an encryption formula $z_1^{d_1}=c_1 \pmod{n_1}$ by using the chip public key $(n_1, d_1)$, where $c_1$ is a first verification code obtained after encrypting the verification information $z_1$; and performs form conversion on the formula $z_1^{d_1}=c_1 \pmod{n_1}$, to obtain $c_1=z_1^{d_1}\% n_1$. If the verification information $z_1$ is 3, $n_1=12$, and $d_1=7$, $c_1=3^7\%12=3$, that is, the first verification code $c_1$ is 3. If the verification private key is $(n_2, e_1)$, for the first verification code $c_1$, the server encrypts the first verification code $c_1$ by using the verification private key $(n_2, e_1)$, where an encryption formula is $c_1^{e_1}=k_1 \pmod{n_2}$, and $k_1$ is the first authentication code; and performs form conversion on the formula $c_1^{e_1}=k_1 \pmod{n_2}$, to obtain $k_1=c_1^{e_1}\% n_2$. If $n_2=55$ and $e_1=17$, $k_1=3^{17}\%55=53$, that is, the first authentication code is 53.

Next, a manner in which the security chip obtains the first information based on the first authentication code is described.

For example, if the verification public key is $(n_2, d_2)$, for a first authentication code $k_1$, the security chip decrypts the first authentication code $k_1$ through a decryption formula $k_1^{d_2}=c_2 \pmod{n_2}$ by using the verification public key $(n_2, d_2)$; and performs form conversion on a formula $c_2^{d_2}=k \pmod{n_2}$, to obtain $c_2=k_1^{d_2}\% n_2$. If the first authentication code $k_1=53$, $n_2=55$, and $d_2=33$, $c_1=53^{33}\%55=3$, that is, the second verification code $c_2$ is obtained as 3. After comparing with the previous example, if the verification public key $(n_2, d_2)$ corresponds to the chip public key $(n_1, d_1)$, the obtained second verification code $c_2$ is the same as the first verification code $c_1$ generated by the server. If the chip private key is $(n_1, e_2)$, the security chip decrypts the first verification code $c_2$ through a decryption formula $c_2^{e_2}=z_2 \pmod{n_1}$, to obtain first information $z_2$. Certainly, if the chip private key $(n_1, e_2)$ corresponds to the verification private key $(n_1, d_1)$, the first information $z_2$ obtained by decryption is also the same as the verification information $z_1$ generated by the server.

The following describes a method for generating the chip private key and the chip public key by the security chip.

In a possible implementation, the security chip generates the chip public key and the chip private key by using an asymmetric encryption algorithm.

For example, the security chip randomly generates two prime numbers a and b, and obtains a product n of a and b; converts the product n into a binary number, where a number of bits of the binary number also represents a number of bits of the asymmetric encryption algorithm; determines a Euler's function $m=\varphi(n)$ of the product n; randomly generates an integer e, where 1<e<m, and e and m are relatively prime; obtains an integer d, so that e*d−1=y*m; and finally generates the chip public key as (n, e) and the chip private key as (n, d). In the process in which the security chip generates e and d, if there may be a plurality of values of e, a plurality of key pairs may be formed according to the plurality of values of e and a plurality of values of d generated by the plurality of values of e.

For example, if a generated by the security chip=5, and b=11, a product n thereof=5*11=55. The security chip converts the product 55 into a binary number 110111. In some embodiments, the number of bits of the binary number is the number of bits of the encryption algorithm. In the above examples, the number of bits of the encryption algorithm is 6 bits. The security chip takes the product into the Euler's function, and $m=\varphi(55)=\varphi(5)\varphi(11)=(5-1)(11-1)=40$ according to a formula. The security chip randomly generates an integer e such as 17, where 17 and 55 are relatively prime, and 1<17<55. Based on a formula e*d−1=y*m, the security chip takes e=17 and m=40 into the formula, to obtain a linear equation with two unknowns, namely, 17*d−1=y*40. The security chip obtains a set of integer solutions of the linear equation with two unknowns as d=33 and y=14. Therefore, the security chip generates the chip public key as (55, 17) and the chip private key as (55, 33).

The above describes by using the security chip generating the key pair based on the Euler's function as an example. In other possible implementations, the security chip also generates the key pair in another manner. This is not limited in the embodiments of this application.

204. The security chip encrypts the first information by using the verification public key and the chip private key, to obtain a second authentication code.

In a possible implementation, the security chip encrypts the first information by using the verification public key, to obtain a third verification code. The security chip encrypts the third verification code by using the chip private key, to obtain the second authentication code.

For example, if the verification public key is $(n_2, d_2)$, for first information $z_2$, the security chip encrypts the verification information through an encryption formula $z_2^{d2}=c_3$ (mod $n_2$) by using the verification public key $(n_2, d_2)$, where $c_3$ is a third verification code obtained after encrypting the first information $z_2$; and performs form conversion on the formula $z_2^{d2}=c_3 \pmod{n_2}$, to obtain $c_3=z_2^{d2} \% n_2$. If the first information $z_2$ is 4, $n_2=15$, and $d_2=11$, $c_3=4^{11}\% 15=4$, that is, the third verification code $c_3$ is 4. If the chip private key is $(n_1, e_2)$, for the third verification code $c_3$, the security chip encrypts the third verification code $c_3$ by using the chip private key $(n_1, e_2)$, where an encryption formula is $c_3^{e2}=k_2$ (mod $n_1$), and $k_2$ is the second authentication code; and performs form conversion on the formula $c_3^{e2}=k_2 \pmod{n_1}$, to obtain $k_2=c_3^{e2} \% n_1$. If $n_1=55$ and $e_2=33$, $k_2=4^{33}\% 55=9$, that is, the second authentication code is 9.

205. The security chip transmits the second authentication code to the server, so that the server verifies the security chip based on the first information in the second authentication code and the verification information.

In a possible implementation, the security chip transmits the second authentication code to the electronic device, and the electronic device transmits the second authentication code to the server. After the second authentication code is received, the server decrypts the second authentication code, to obtain the first information in the second authentication code. The server compares the first information with the verification information. When the first information matches the verification information, the server determines that key filling of the security chip is completed, and the security chip can be used from the factory. When the first information is different from the verification information, the server determines that the key filling of the security chip is abnormal, and the security chip cannot be used normally.

Through the above step 203 to step 205, the security chip can perform further verification through the server after key filling, so as to ensure that keys cooperate with each other, correctly implement encryption and decryption of information, and ensure the accuracy of information transmission.

All the foregoing technical solutions may be arbitrarily combined to form an embodiment of this application, and details are not described herein again.

Through the technical solutions provided in the embodiments of this application, a verification public key generated by a server can be filled into a security chip, so that the security chip encrypts information by using the verification public key. In this way, in a process of key filling, the transmission of private keys is not involved at all, thereby reducing the risk of leakage of the private keys and improving the security of the information.

Figure 3:
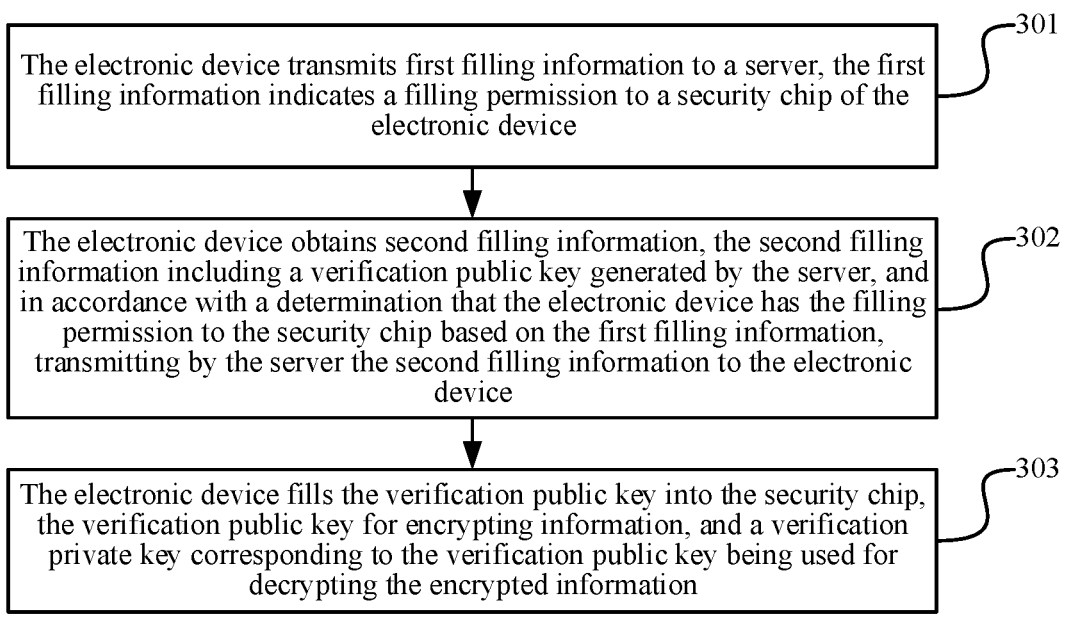
FIG. 3 is a flowchart of a key filling method according to an embodiment of this application.

FIG. 3 is a flowchart of a key filling method according to an embodiment of this application. Referring to FIG. 3, by using an electronic device as an execution body, the method includes the following steps.

301. The electronic device transmits first filling information to a server, the first filling information being used for indicating a filling permission of the electronic device to a security chip.

The first filling information includes a chip identifier of the security chip and a device identifier of the electronic device, and the server can determine whether the electronic device has the filling permission to the security chip based on the chip identifier and the device identifier.

In a possible implementation, the electronic device encrypts the first filling information by using an electronic device private key, to obtain first encrypted information, where the electronic device private key is a private key corresponding to the electronic device. The electronic device transmits the first encrypted information to the server, where the first encrypted information is encrypted first filling information.

For example, the electronic device maps the first filling information to a first information digest corresponding to the first filling information, where the first information digest is used for verifying the first filling information. The electronic device encrypts the first information digest and the first filling information by using the electronic device private key, to obtain the first encrypted information. The electronic device transmits the first encrypted information to the server, and the server verifies the filling permission of the electronic device to the security chip based on the first encrypted information. In the process in which the server verifies the filling permission of the electronic device to the security chip based on the first encrypted information, the server can verify whether the first filling information is tampered with based on the first information digest, that is, maps the first filling information to a second information digest by using first relationship data, and compares the first information digest with the second information digest. When the first information digest matches the second information digest, the server can determine that the first filling information is not tampered with. Correspondingly, when the first information digest is different from the second information digest, the server can determine that the first filling information is tampered with. The first relationship data is relationship data used when the electronic device maps the first filling information to the first information digest, and the first relationship data is an encryption function. In this manner, the server can process the first filling information by using an encryption function the same as that of the electronic device, to obtain the second information digest, and compare the first information digest with the second information digest to determine whether the first filling information is tampered with.

For example, the electronic device maps the first filling information to the first information digest by using the first relationship data, where the first relationship data is an asymmetric encryption function, the first relationship data can map information with different lengths to a hash with a fixed length, and the hash with the fixed length is an information digest. In some embodiments, the first relationship data is a message-digest 5 (MD5) algorithm, a secure hash algorithm 2 (SHA-2), or another asymmetric encryption algorithm. This is not limited in the embodiments of this application. The electronic device respectively encrypts the first information digest and the first filling information by using the electronic device private key, to obtain an electronic device signature corresponding to the first information digest and encrypted information corresponding to the first filling information. The electronic device splices the electronic device signature and the encrypted information corresponding to the first filling information, to obtain the first encrypted information. The electronic device transmits the first encrypted information to the server.

302. The electronic device obtains second filling information, the second filling information including a verification public key generated by the server, in accordance with a determination that the electronic device has the filling permission to the security chip based on the first filling information, transmitting, by the server, the second filling information to the electronic device.

In a possible implementation, in accordance with a determination that the electronic device has the filling permission to the security chip, the electronic device obtains second encrypted information transmitted by the server, where the second encrypted information is obtained by the server encrypting the second filling information by using a server private key of the server. The electronic device decrypts the second encrypted information by using a server public key, to obtain the second filling information, where the server public key corresponds to the server private key.

For example, after determining that the electronic device has the filling permission to the security chip based on the first filling information, the server can encrypt the generated second filling information by using the server private key, to obtain the second encrypted information, where the server generates the second filling information based on the verification public key, and the second encrypted information is encrypted second filling information. The server transmits the second encrypted information to the electronic device. After the second encrypted information is received, the electronic device can decrypt the second encrypted information by using the server public key, to obtain the second filling information. The server can carry the server public key in the second filling information, and can also transmit the server public key to the electronic device in advance. This is not limited in the embodiments of this application. In some embodiments, in accordance with a determination that the first filling information includes the chip identifier of the security chip and the device identifier of the electronic device, the server determines whether the chip identifier and the device identifier has a binding relationship. In accordance with a determination that the chip identifier and the device identifier have the binding relationship, the server determines that the electronic device has the filling permission to the security chip, where the filling permission means that the electronic device can add information into the security chip.

For example, if the server private key of the server is ($n_3$, $e_3$), for second filling information $z_3$, the server can encrypt the second filling information $z_3$ through an encryption formula $z_3^{e_3}=c_4(\mathrm{mod}\ n_3)$ by using the server private key ($n_3$, $e_3$), where $c_4$ is second encrypted information obtained after encrypting the second filling information $z_3$; and perform form conversion on the formula $z_3^{e_3}=c_4(\mathrm{mod}\ n_3)$, so that $c_4=z_3^{e_3}\%\ n_3$ can be obtained. If the second filling information $z_3$ is 2, $n_3=21$, and $e_3=16$, $c_1=2^{16}\%21=16$, that is, the second encrypted information $c_4$ is 16, and the server transmits the second encrypted information $c_4$ to the electronic device. After the second encrypted information $c_4$ is received, the electronic device can decrypt the second encrypted information $c_4$ by using the server public key, to obtain the second filling information $z_3$.

303. The electronic device fills the verification public key into the security chip, the verification public key being used for encrypting information, and a verification private key corresponding to the verification public key being used for decrypting the encrypted information.

After the electronic device fills the security chip, the security chip can store the verification public key. In a process of subsequently transmitting encrypted information, the security chip can encrypt information that needs to be transmitted by using the verification public key, and the server can decrypt the encrypted information by using the verification private key corresponding to the verification public key.

All the foregoing technical solutions may be arbitrarily combined to form an embodiment of this application, and details are not described herein again.

Through the technical solutions provided in the embodiments of this application, a verification public key generated by a server can be filled into a security chip, so that the security chip encrypts information by using the verification public key. In this way, in a process of key filling, the transmission of private keys is not involved at all, thereby reducing the risk of leakage of the private keys and improving the security of the information.

Figure 4:
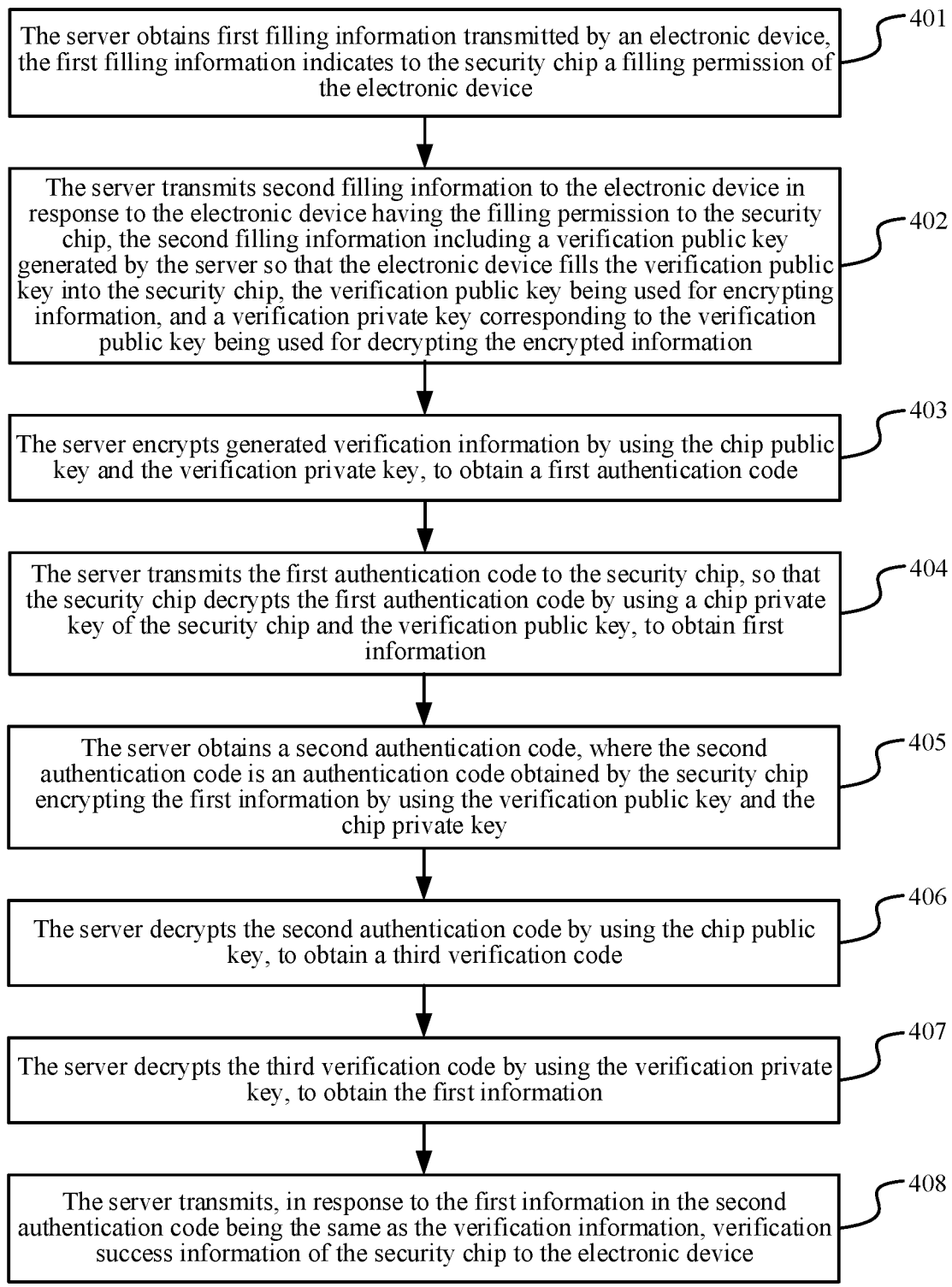
FIG. 4 is a flowchart of a key filling method according to an embodiment of this application.

FIG. 4 is a flowchart of a key filling method according to an embodiment of this application. Referring to FIG. 4, by using a server as an execution body, the method includes the following steps.

401. The server obtains first filling information transmitted by an electronic device, the first filling information being used for indicating a filling permission of the electronic device to a security chip.

In a possible implementation, the server obtains first encrypted information transmitted by the electronic device, where the first encrypted information is obtained by the electronic device encrypting the first filling information by using an electronic device private key of the electronic device. The server decrypts the first encrypted information by using an electronic device public key, to obtain the first filling information, where the electronic device public key corresponds to the electronic device private key.

402. The server transmits second filling information to the electronic device in response to the electronic device having the filling permission to the security chip, the second filling information including a verification public key generated by the server so that the electronic device fills the verification public key into the security chip, the verification public key being used for encrypting information, and a verification private key corresponding to the verification public key being used for decrypting the encrypted information.

In a possible implementation, the server encrypts the second filling information by using a server private key of the server, to obtain second encrypted information. The server transmits the second encrypted information to the electronic device.

For example, the server maps the second filling information to a fourth information digest corresponding to the second filling information. The server encrypts the fourth information digest and the second filling information by using the server private key, to obtain the second encrypted information.

For example, the server maps the second filling information to the fourth information digest by using second relationship data, where the second relationship data is an asymmetric encryption function, the second relationship data can map information with different lengths to a hash with a fixed length. In some embodiments, the second relationship data is a message-digest 5 (MD5) algorithm, a secure hash algorithm 2 (SHA-2), or another algorithm. This is not limited in the embodiments of this application. The server respectively encrypts the fourth information digest and the second filling information by using the server private key, to obtain a server signature corresponding to the fourth information digest and encrypted information corresponding to the second filling information. The server splices the server signature and the encrypted information corresponding to the second filling information, to obtain the second encrypted information. The server transmits the second encrypted information to the electronic device. After the second encrypted information is received, the electronic device can decrypt the second encrypted information by using the server public key, to obtain the fourth information digest and the second filling information. In some embodiments, before the electronic device obtains the second filling information and fills the verification public key into the security chip, the electronic device can verify whether the second filling information is tampered with based on the fourth information digest, that is, maps the second filling information to a fifth information digest by using the second relationship data, and compares the fifth information digest with the fourth information digest. In accordance with a determination that the fifth information digest matches the fourth information digest, the electronic device determines that the second filling information is not tampered with, where the second filling information is filling information transmitted by the server; and fill the verification public key in the second filling information into the security chip, so that the security chip can encrypt information by using the verification public key.

In some embodiments, the first filling information includes a chip public key of the security chip. After step 402, the server can also perform the following steps.

403. The server encrypts generated verification information by using the chip public key and the verification private key, to obtain a first authentication code.

In a possible implementation, the server encrypts the verification information by using the chip public key, to obtain a first verification code. The server encrypts the first verification code by using the verification private key, to obtain the first authentication code.

For example, if the chip public key is $(n_1, d_1)$, for verification information $z_1$, the server can encrypt the verification information through an encryption formula $z_1^{d_1} = c_1$ (mod $n_1$) by can using the chip public key $(n_1, d_1)$, where $c_1$ is a first verification code obtained after encrypting the verification information $z_1$; and perform form conversion on the formula $z_1^{d_1} = c_1 \pmod{n_1}$, so that $c_1 = z_1^{d_1} \% n_1$ can be obtained. If the verification information $z_1$ is 3, $n_1 = 12$, and $d_1 = 7$, $c_1 = 3^7 \% 12 = 3$, that is, the first verification code $c_1$ is 3. If the verification private key is $(n_2, e_1)$, for the first verification code $c_1$, the server can encrypt the first verification code $c_1$ by can using the verification private key $(n_2, e_1)$, where an encryption formula is $c_1^{e_1} = k_1 \pmod{n_2}$, and $k_1$ is the first authentication code; and perform form conversion on the formula $c_1^{e_1} = k_1 \pmod{n_2}$, so that $k_1 = c_1^{e_1} \% n_2$ can be obtained. If $n_2 = 55$ and $e_1 = 17$, $k_1 = 3^{17} \% 55 = 53$, that is, the first authentication code is 53.

404. The server transmits the first authentication code to the security chip, so that the security chip decrypts the first authentication code by using a chip private key of the security chip and the verification public key, to obtain first information.

405. The server obtains a second authentication code, where the second authentication code is an authentication code obtained by the security chip encrypting the first information by using the verification public key and the chip private key.

In a possible implementation, the server receives third encrypted information, where the third encrypted information is encrypted information obtained by the electronic device encrypting the second authentication code by using an electronic device private key of the electronic device. The server decrypts the third encrypted information by using an electronic device public key, to obtain the second authentication code, where the electronic device public key corresponds to the electronic device private key.

406. The server decrypts the second authentication code by using the chip public key, to obtain a third verification code.

For example, if the chip public key is $(n_1, d_1)$, for a second authentication code $k_2$, the server can decrypt the second authentication code $k_2$ through a decryption formula $k_2^{d_1} = c_3$ (mod $n_1$) by using the chip public key $(n_1, d_1)$; and performs form conversion on a formula $k_2^{d_1} = c_3 \pmod{n_1}$, so that $c_3 = k_2^{d_1} \% n_1$ can be obtained. If the second authentication code $k_2 = 9$, $n_2 = 13$, and $d_2 = 11$, $c_1 = 9^{11} \% 13 = 3$, that is, the third verification code $c_3$ can be obtained as 3.

407. The server decrypts the third verification code by using the verification private key, to obtain the first information.

For example, if the verification private key is $(n_2, e_1)$, for a third verification code $c_3$, the server can decrypt the third verification code $c_3$ through a decryption formula $z_2^{e_1} = c_3$ (mod $n_2$) by using the verification private key ($n_2$, $e_1$); and performs form conversion on a formula $z_2^{e1}=c_3 \pmod{n_2}$, so that $c_3=z_2^{e1}\% n_2$ can be obtained. If the third verification code $c_3=3$, $n_2=11$, and $d_2=9$, $c_1=3^9\%11=4$, that is, first information $z_2$ is obtained as 4.

408. The server transmits, in response to the first information in the second authentication code being the same as the verification information, verification success information of the security chip to the electronic device.

The verification success information represents that the server determines that key filling of the security chip is completed, and the security chip can be used from the factory.

In addition to step 408, the server transmits, in response to the first information in the second authentication code being different from the verification information, verification failure information of the security chip to the electronic device, so that the electronic device reperforms key filling on the security chip.

All the foregoing technical solutions may be arbitrarily combined to form an embodiment of this application, and details are not described herein again.

Through the technical solutions provided in the embodiments of this application, a verification public key generated by a server can be filled into a security chip, so that the security chip encrypts information by using the verification public key. In this way, in a process of key filling, the transmission of private keys is not involved at all, thereby reducing the risk of leakage of the private keys and improving the security of the information.

Figure 5:
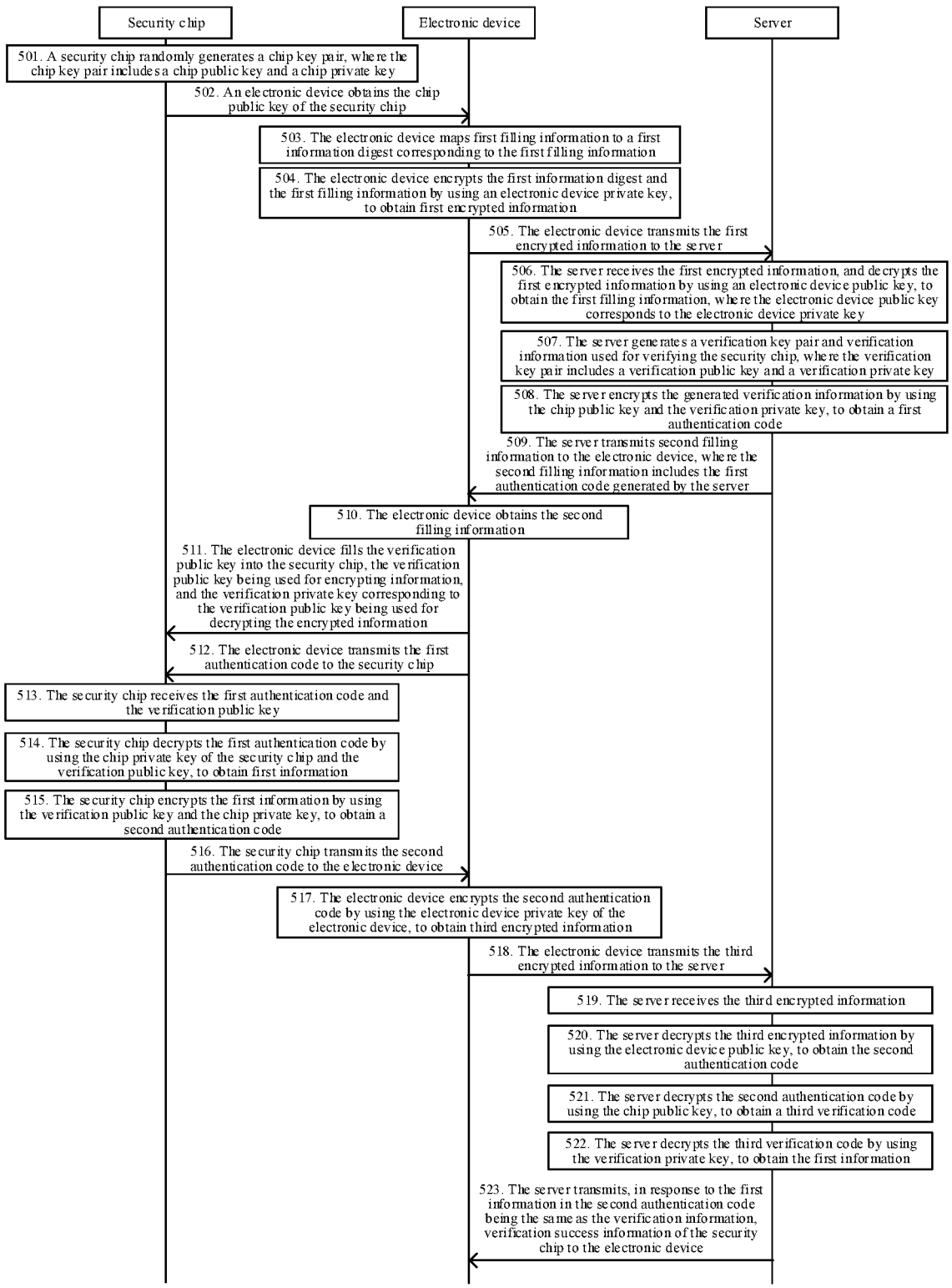
FIG. 5 is an interaction flowchart of a key filling method according to an embodiment of this application.

To more clearly describe the technical solutions provided in this embodiment of this application, the following will describe interaction processes among a security chip, an electronic device, and a server with the above steps. FIG. 5 is an interaction flowchart of a key filling method according to an embodiment of this application. Referring to FIG. 5, the method includes the following steps.

501. A security chip randomly generates a chip key pair, where the chip key pair includes a chip public key and a chip private key.

The security chip may generate a plurality of chip key pairs.

In a possible implementation, the security chip generates the chip public key and the chip private key by using an asymmetric encryption algorithm.

For example, the security chip randomly generates two prime numbers a and b, and obtains a product n of a and b; converts the product n into a binary number, where a number of bits of the binary number also represents a number of bits of the asymmetric encryption algorithm; determines a Euler's function $m=\varphi(n)$ of the product n; randomly generates an integer e, where $1<e<m$, and e and m are relatively prime; obtains an integer d, so that $e*d-1=y*m$; and finally generates the chip public key as (n, e) and the chip private key as (n, d). In the process in which the security chip generates e and d, if there may be a plurality of values of e, a plurality of key pairs may be formed according to the plurality of values of e and a plurality of values of d generated by the plurality of values of e.

For example, if a generated by the security chip=5, and b=11, a product n thereof=5*11=55. The security chip converts the product 55 into a binary number 110111. In some embodiments, the number of bits of the binary number is the number of bits of the encryption algorithm. In the above examples, the encryption algorithm is 6 bits. The security chip takes the product into the Euler's function, and $m=\varphi(55)=\varphi(5)\varphi(11)=(5-1)(11-1)=40$ according to a formula. The security chip randomly generates an integer e such as 17, where 17 and 55 are relatively prime, and $1<17<55$. Based on a formula $e*d-1=y*m$, the security chip takes $e=17$ and $m=40$ into the formula, to obtain a linear equation with two unknowns, namely, $17*d-1=y*40$. The security chip obtains a set of integer solutions of the linear equation with two unknowns as $d=33$ and $y=14$. Therefore, the security chip generates the chip public key as (55, 17) and the chip private key as (55, 33).

The above describes by using the security chip generating the key pair based on the Euler's function as an example. In other possible implementations, the security chip can also generate the key pair in another manner. This is not limited in the embodiments of this application.

502. An electronic device obtains the chip public key of the security chip.

The chip public key may be actively obtained by the electronic device from the security chip, or may be actively transmitted by the electronic device to the security chip. This is not limited in the embodiments of this application.

503. The electronic device maps first filling information to a first information digest corresponding to the first filling information.

The first filling information includes a chip identifier of the security chip and a device identifier of the electronic device.

In a possible implementation, the electronic device maps the first filling information to the first information digest by using first relationship data, where the first relationship data is an asymmetric encryption function, the first relationship data can map information with different lengths to a hash with a fixed length. In some embodiments, the first relationship data is a message-digest 5 (MD5) algorithm, a secure hash algorithm 2 (SHA-2), or another algorithm. This is not limited in the embodiments of this application.

For example, if the first filling information is 6, the electronic device can process 6 by using the MD5 algorithm, to obtain a first information digest 5a880faf6fb5e608.

504. The electronic device encrypts the first information digest and the first filling information by using an electronic device private key, to obtain first encrypted information.

In some embodiments, the first encrypted information may also be referred to as a registration request for the security chip, and the registration request is used for requesting the server to register the security chip.

In a possible implementation, the electronic device respectively encrypts the first information digest and the first filling information by using the electronic device private key, to obtain an electronic device signature corresponding to the first information digest and encrypted information corresponding to the first filling information. In some embodiments, the electronic device signature is also referred to as a manufacturer's signature. The electronic device splices the electronic device signature and the encrypted information corresponding to the first filling information, to obtain the first encrypted information. The electronic device transmits the first encrypted information to the server.

For example, if the electronic device private key is ($n_4$, $e_4$), for first filling information $z_4$, the electronic device encrypts second filling information $z_3$ through an encryption formula $z_4^{e4}=c_5 \pmod{n_4}$ by using the electronic device private key ($n_4$, $e_4$), where $c_5$ is corresponding encrypted information after encrypting the first filling information $z_4$; and performs form conversion on the formula $z_4^{e4}=c_5 \pmod{n_4}$, to obtain $c_5=z_4^{e4}\% n_4$. If the first filling information $n_4$ is 4, $n_4=25$, and $e_4=21$, $c_1=4^{21}\%25=4$, that is, the encrypted information corresponding to the first filling information $n_4$ is 4. The electronic device encrypts a first information digest $l_1$ through an encryption formula $l_1^{e4}=c_6 \pmod{n_4}$ by using the electronic device private key $(n_4, e_4)$, where $c_6$ is the electronic device signature; and performs form conversion on the formula $l_1^{e4}=c_6 \pmod{n_4}$, to obtain $c_6=l_1^{e4}\% n_4$. If the first filling information $l_1$ is 6, $n_4=25$, and $e_4=21$, $c_1=6^{21}\%25=6$, that is, the electronic device signature $c_6$ is 6. The electronic device splices the encrypted information corresponding to the first filling information $n_4$ and the electronic device signature, to obtain first encrypted information (4, 6), and transmits the first encrypted information (4, 6) to the server.

505. The electronic device transmits the first encrypted information to the server.

506. The server receives the first encrypted information, and decrypts the first encrypted information by using an electronic device public key, to obtain the first filling information, where the electronic device public key corresponds to the electronic device private key.

In a possible implementation, the server receives the first encrypted information, and decrypts the first encrypted information by using the electronic device public key, to obtain a second information digest and third filling information. The server maps the third filling information to a third information digest corresponding to the third filling information. The server determines, in response to the third information digest being the same as the second information digest, that the third filling information is the first filling information transmitted by the electronic device. A process in which the server compares the second information digest with the third information digest is a process of verifying authenticity of the third filling information.

In some embodiments, the server can store the chip public key carried in the first filling information, so as to facilitate decryption in a process of subsequently transmitting information.

507. The server generates a verification key pair and verification information used for verifying the security chip, where the verification key pair includes a verification public key and a verification private key.

In a possible implementation, the server can generate the verification key pair by using an asymmetric encryption algorithm. The server randomly generates the verification information, for example, the server randomly generates a character string as the verification information. In some embodiments, the verification information is also referred to as a session key.

The following describes the method for generating the verification key pair by the server.

For example, the server randomly generates two prime numbers c and d, and obtains a product o of c and d. The server determines a Euler's function $m=\varphi(o)$ of the product o; randomly generates an integer f, where $1<f<m$, and f and m are relatively prime; obtains an integer d, so that $f*d-1=y*m$; and finally generates the verification public key as (o, f) and the verification private key as (o, d). In the process in which the server generates f and d, if there may be a plurality of values of f, a plurality of key pairs may be formed according to the plurality of values of f and a plurality of values of d generated by the plurality of values of f.

For example, if c generated by the server=5, and d=11, a product o thereof=5*11=55. The server converts the product 55 into a binary number 110111. In some embodiments, the number of bits of the binary number is the number of bits of the encryption algorithm. In the above examples, the number of bits of the encryption algorithm is 6 bits. The server takes the product into the Euler's function, and $m=\varphi(55)=\varphi(5)\varphi(11)=(5-1)(11-1)=40$ according to a formula. The server randomly generates an integer f such as 17, where 17 and 55 are relatively prime, and $1<17<55$. Based on a formula $f*d-1=y*m$, the server takes f=17 and m=40 into the formula, to obtain a linear equation with two unknowns, namely, $17*d-1=y*40$. The server obtains a set of integer solutions of the linear equation with two unknowns as d=33 and y=14. Therefore, the server generates the verification public key as (55, 17) and the verification private key as (55, 33).

The above describes by using the server generating the key pair based on the Euler's function as an example. In other possible implementations, the server can also generate the key pair in another manner. This is not limited in the embodiments of this application.

508. The server encrypts the generated verification information by using the chip public key and the verification private key, to obtain a first authentication code.

In a possible implementation, the server encrypts the verification information by using the chip public key, to obtain a first verification code. The server encrypts the first verification code by using the verification private key, to obtain the first authentication code.

For example, if the chip public key is $(n_1, d_1)$, for verification information $z_1$, the server can encrypt the verification information through an encryption formula $z_1^{d1}=c_1 \pmod{n_1}$ by can using the chip public key $(n_1, d_1)$, where $c_1$ is a first verification code obtained after encrypting the verification information $z_1$; and perform form conversion on the formula $z_1^{d1}=c_1 \pmod{n_1}$, so that $c_1=z_1^{d1}\% n_1$ can be obtained. If the verification information $z_1$ is 3, $n_1=12$, and $d_1=7$, $c_1=3^7\%12=3$, that is, the first verification code $c_1$ is 3. If the verification private key is $(n_2, e_1)$, for the first verification code $c_1$, the server can encrypt the first verification code $c_1$ by can using the verification private key $(n_2, e_1)$, where an encryption formula is $c_1^{e1}=k_1 \pmod{n_2}$, and $k_1$ is the first authentication code; and perform form conversion on the formula $c_1^{e1}=k_1 \pmod{n_2}$, so that $k_1=c_1^{e1}\% n_2$ can be obtained. If $n_2=55$ and $e_1=17$, $k_1=3^{17}\% 55=53$, that is, the first authentication code is 53.

509. The server transmits second filling information to the electronic device, where the second filling information includes the first authentication code generated by the server.

In a possible implementation, the server encrypts the second filling information by using a server private key, to obtain second encrypted information. In some embodiments, the second encrypted information is also referred to as a server signature.

For example, the server maps the second filling information to a fourth information digest of the second filling information. The server encrypts the fourth information digest and the second filling information by using the server private key, to obtain the second encrypted information.

510. The electronic device obtains the second filling information.

In a possible implementation, the electronic device decrypts the second encrypted information by using a server public key, to obtain the second filling information, where the server public key corresponds to the server private key.

For example, the electronic device receives the second encrypted information, and decrypts the second encrypted information by using the server public key, to obtain a fifth information digest and fourth filling information. The electronic device maps the fourth filling information to a sixth information digest corresponding to the fourth filling information. The electronic device determines, in response to the sixth information digest being the same as the fourth filling information, that the fourth filling information is the second filling information transmitted by the server.

511. The electronic device fills the verification public key into the security chip, the verification public key being used for encrypting information, and the verification private key corresponding to the verification public key being used for decrypting the encrypted information.

A process in which the electronic device fills the verification public key into the security chip may also be referred to as a process of burning the verification public key to the security chip.

512. The electronic device transmits the first authentication code to the security chip.

In some embodiments, the electronic device can transmit the first authentication code to the security chip while filling the verification public key. This is not limited in the embodiments of this application.

513. The security chip receives the first authentication code and the verification public key.

514. The security chip decrypts the first authentication code by using the chip private key of the security chip and the verification public key, to obtain first information.

In a possible implementation, the security chip decrypts the first authentication code by using the verification public key, to obtain a second verification code. The security chip decrypts the second verification code by using the chip private key, to obtain the first information.

For example, if the verification public key is $(n_2, d_2)$, for a first authentication code $k_1$, the security chip can decrypt the first authentication code $k_1$ through a decryption formula $k_1^{d2}=c_2 \pmod{n_2}$ by can using the verification public key $(n_2, d_2)$; and performs form conversion on a formula $c_2^{d2}=k \pmod{n_2}$, so that $c_2=k_1^{d2}\% n_2$ can be obtained. If the first authentication code $k_1=53$, $n_2=55$, and $d_2=33$, $c_1=53^{33}\% 55=3$, that is, the second verification code $c_2$ can be obtained as 3. After comparing with the previous example, if the verification public key $(n_2, d_2)$ corresponds to the chip public key $(n_2, e_1)$, the obtained second verification code $c_2$ is the same as the first verification code $c_1$ generated by the server. If the chip private key is $(n_1, e_2)$, the security chip can decrypt the first verification code $c_2$ through a decryption formula $c_2^{e2}=z_2 \pmod{n_1}$, to obtain first information $z_2$. Certainly, if the chip private key $(n_1, e_2)$ corresponds to the verification private key $(n_1, d_1)$, the first information $z_2$ obtained by decryption is also the same as the verification information $z_1$ generated by the server.

515. The security chip encrypts the first information by using the verification public key and the chip private key, to obtain a second authentication code.

In a possible implementation, the security chip encrypts the first information by using the verification public key, to obtain a third verification code. The security chip encrypts the third verification code by using the chip private key, to obtain the second authentication code.

For example, if the verification public key is $(n_2, d_2)$, for first information $z_2$, the security chip can encrypt the verification information through an encryption formula $z_2^{d2}=c_3 \pmod{n_2}$ by using the verification public key $(n_2, d_2)$, where $c_3$ is a third verification code obtained after encrypting the first information $z_2$; and perform form conversion on the formula $z_2^{d2}=c_3 \pmod{n_2}$, so that $c_3=z_2^{d2}\% n_2$ can be obtained. If the first information $z_2$ is 4, $n_2=15$, and $d_2=11$, $c_3=4^{11}\%15=4$, that is, the third verification code $c_3$ is 4. If the chip private key is $(n_1, e_2)$, for the third verification code $c_3$, the security chip can encrypt the third verification code $c_3$ by using the chip private key $(n_1, e_2)$, where an encryption formula is $c_3^{e2}=k_2 \pmod{n_1}$, and $k_2$ is the second authentication code; and perform form conversion on the formula $c_3^{e2}=k_2 \pmod{n_1}$, so that $k_2=c_3^{e2}\% n_1$ can be obtained. If $n_1=55$ and $e_2=33$, $k_2=4^{33}\% 55=9$, that is, the second authentication code is 9.

516. The security chip transmits the second authentication code to the electronic device.

517. The electronic device encrypts the second authentication code by using the electronic device private key of the electronic device, to obtain third encrypted information.

For example, if the electronic device private key is $(n_4, e_4)$, for a second authentication code $k_2$, the electronic device can encrypt the second authentication code $k_2$ through an encryption formula $z_5^{e4}=k_2 \pmod{n_4}$ by using the electronic device private key $(n_4, e_4)$, where $z_5$ is the third encrypted information; and performs form conversion on the formula $z_5^{e4}=k_2 \pmod{n_4}$, so that $k_2=z_5^{e4}\% n_4$ can be obtained. If the first filling information $k_2$ is 9, $n_4=25$, and $e_4=21$, $c_1=9^{21}\%25=4$, that is, the third encrypted information is 9.

518. The electronic device transmits the third encrypted information to the server.

The third encrypted information is also referred to as an enabling request for the security chip, which is used for requesting the server to enable the security chip.

519. The server receives the third encrypted information.

520. The server decrypts the third encrypted information by using the electronic device public key, to obtain the second authentication code.

For example, if the electronic device public key is $(n_4, d_4)$, for third encrypted information $z_5$, the server can decrypt the third encrypted information $z_5$ through a decryption formula $k_2^{d4}=z_5 \pmod{n_4}$ by using the electronic device public key $(n_4, d_4)$; and performs form conversion on a formula $k_2^{d4}=z_5 \pmod{n_4}$, so that $c_5=k_2^{d4}\% n_4$ can be obtained. If the third encrypted information $z_5=9$, $n_2=55$, and $d_2=21$, $z_5=9^{21}\%55=9$, that is, a second authentication code $z_5$ can be obtained as 9.

521. The server decrypts the second authentication code by using the chip public key, to obtain a third verification code.

For example, if the chip public key is $(n_1, d_1)$, for a second authentication code $k_2$, the server can decrypt the second authentication code $k_2$ through a decryption formula $k_2^{d1}=c_3 \pmod{n_1}$ by using the chip public key $(n_1, d_1)$; and performs form conversion on a formula $k_2^{d1}=c_3 \pmod{n_1}$, so that $c_3=k_2^{d1}\% n_1$ can be obtained. If the second authentication code $k_2=9$, $n_2=13$, and $d_2=11$, $c_1=9^{11}\% 13=3$, that is, the third verification code $c_3$ can be obtained as 3.

522. The server decrypts the third verification code by using the verification private key, to obtain the first information.

For example, if the verification private key is $(n_2, e_1)$, for a third verification code $c_3$, the server can decrypt the third verification code $c_3$ through a decryption formula $z_2^{e1}=c_3 \pmod{n_2}$ by using the verification private key $(n_2, e_1)$; and performs form conversion on a formula $z_2^{e1}=c_3 \pmod{n_2}$, so that $c_3=z_2^{e1}\% n_2$ can be obtained. If the third verification code $c_3=3$, $n_2=11$, and $d_2=9$, $c_1=3^9\%11=4$, that is, first information $z_2$ is obtained as 4.

523. The server transmits, in response to the first information in the second authentication code being the same as the verification information, verification success information of the security chip to the electronic device.

After the electronic device receives the verification success information of the security chip, a process of filling the security chip is completed, and the security chip can be used normally.

That is, in a scenario of customizing a stored value card, after the electronic device receives a verification success information of a security chip, a manufacturer of the security chip can also make the filled security chip out of factory, for example, send the security chip to a manufacturer of the stored value card, and the manufacturer of the stored value card installs the security chip on the stored value card. In a process in which a user uses the stored value card, when a device reads information in the stored value card, the security chip can encrypt the information, thereby avoiding leakage of the information in the stored value card. When the server writes information to the stored value card, the written information also needs to be decrypted by the security chip, so as to ensure the security of the written information.

In a scenario of data encryption, after the electronic device receives a verification success information of a security chip, a manufacturer of the security chip can also make the filled security chip out of factory, for example, send the security chip to a manufacturer of the device, and the manufacturer of the device installs the security chip on the stored value card. When a user communicates with the outside world by using a specific communication application, the security chip can encrypt information transmitted by the user, thereby avoiding leakage of the information. When reply information transmitted by the server is obtained, the reply information also needs to be decrypted by the security chip, so as to ensure the security of the written information.

In addition to step 523, the server transmits, in response to the first information in the second authentication code being different from the verification information, verification failure information of the security chip to the electronic device, so that the electronic device reperforms key filling on the security chip.

In a possible implementation, in response to the first information in the second authentication code being different from the verification information, the electronic device can initialize the security chip and erase data stored in the security chip; and repeat the above step 501 to step 511, to complete refilling of the security chip.

All the foregoing technical solutions may be arbitrarily combined to form an embodiment of this application, and details are not described herein again.

Through the technical solutions provided in the embodiments of this application, a verification public key generated by a server can be filled into a security chip, so that the security chip encrypts information by using the verification public key. In this way, in a process of key filling, the transmission of private keys is not involved at all, thereby reducing the risk of leakage of the private keys and improving the security of the information.

Figure 6:
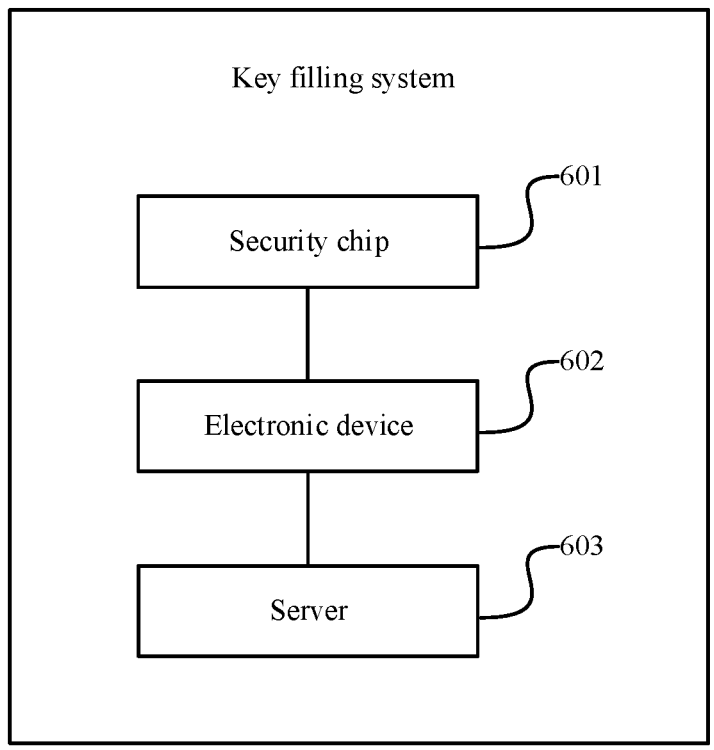
FIG. 6 is a schematic structural diagram of a key filling system according to an embodiment of this application.

In addition to this, an embodiment of this application further provides a key filling system. Referring to FIG. 6, the system includes a security chip 601, an electronic device 602, and a server 603.

The electronic device 602 is configured to transmit first filling information to the server 603, the first filling information being used for indicating a filling permission of the electronic device 602 to the security chip 601.

The server 603 is configured to receive the first filling information, in accordance with a determination that the electronic device 602 has the filling permission to the security chip 601 based on the first filling information, transmitting second filling information to the electronic device 602. The second filling information includes a verification public key generated by the server 603.

The electronic device 602 is further configured to receive the second filling information, and fill the verification public key into the security chip 601, the verification public key being used for encrypting information, and a verification private key corresponding to the verification public key being used for decrypting the encrypted information.

In a possible implementation, the electronic device 602 is further configured to encrypt the first filling information by using an electronic device private key of the electronic device 602, to obtain first encrypted information, and transmit the first encrypted information to the server 603.

The server 603 is further configured to receive the first encrypted information, and decrypt the first encrypted information by using an electronic device public key, to obtain the first filling information, where the electronic device public key corresponds to the electronic device private key.

In a possible implementation, the electronic device 602 is further configured to map the first filling information to a first information digest corresponding to the first filling information.

The electronic device 602 is further configured to encrypt the first information digest and the first filling information by using the electronic device private key, to obtain the first encrypted information.

The server 603 is further configured to receive the first encrypted information, and decrypt the first encrypted information by using the electronic device public key, to obtain a second information digest and third filling information.

The server 603 is further configured to map the third filling information to a third information digest corresponding to the third filling information.

The server 603 is further configured to determine, in response to the third information digest being the same as the second information digest, that the third filling information is the first filling information obtained by the electronic device 602.

In a possible implementation, the first filling information includes a chip public key of the security chip 601, and the second filling information includes a first authentication code generated by the server 603.

The server 603 is further configured to encrypt generated verification information by using the chip public key and the verification private key, to obtain a first authentication code.

The electronic device 602 is further configured to transmit the first authentication code and the verification public key to the security chip 601.

The security chip 601 is configured to receive the first authentication code and the verification public key.

The security chip 601 is further configured to decrypt the first authentication code by using a chip private key of the security chip 601 and the verification public key, to obtain first information.

The security chip 601 is further configured to encrypt the first information by using the verification public key and the chip private key, to obtain a second authentication code.

The server 603 is further configured to obtain the second authentication code, and decrypt the second authentication code by using the verification private key and the chip public key, to obtain the first information.

The server 603 is further configured to transmit, in response to the first information in the second authentication code being the same as the verification information, verification success information of the security chip 601 to the electronic device 602.

In a possible implementation, the server 603 is further configured to:
encrypt the verification information by using the chip public key, to obtain a first verification code; and
encrypt the first verification code by using the verification private key, to obtain the first authentication code.

In a possible implementation, the security chip 601 is further configured to:
decrypt the first authentication code by using the verification public key, to obtain a second verification code; and
decrypt the second verification code by using the chip private key, to obtain the first information.

In a possible implementation, the security chip 601 is further configured to randomly generate a chip key pair, where the chip key pair includes the chip public key and the chip private key.

In a possible implementation, the security chip 601 is further configured to:
encrypt the first information by using the verification public key, to obtain a third verification code; and
encrypt the third verification code by using the chip private key, to obtain the second authentication code.

In a possible implementation, the electronic device 602 is further configured to:
encrypt the second authentication code by using the electronic device private key of the electronic device 602, to obtain third encrypted information; and
transmit the third encrypted information to the server 603.

The server 603 is further configured to:
receive the third encrypted information;
decrypt the third encrypted information by using the electronic device public key, to obtain the second authentication code;
decrypt the second authentication code by using the chip public key, to obtain a third verification code; and
decrypt the third verification code by using the verification private key, to obtain the first information.

In a possible implementation, the server 603 is further configured to encrypt the second filling information by using a server private key of the server 603, to obtain second encrypted information.

The electronic device 602 is further configured to decrypt the second encrypted information by using a server public key, to obtain the second filling information, where the server public key corresponds to the server private key.

In a possible implementation, the server 603 is further configured to map the second filling information to a fourth information digest corresponding to the second filling information.

The server 603 is further configured to encrypt the fourth information digest and the second filling information by using the server private key, to obtain the second encrypted information.

The electronic device 602 is further configured to receive the second encrypted information, and decrypt the second encrypted information by using the server public key, to obtain a fifth information digest and fourth filling information.

The electronic device 602 is further configured to map the fourth filling information to a sixth information digest corresponding to the fourth filling information.

The electronic device 602 is further configured to determine, in response to the sixth information digest being the same as the fourth information digest, that the fourth filling information is the second filling information transmitted by the server 603.

In a possible implementation, the security chip 601 is further configured to encrypt transmitted information by using the chip private key of the security chip, to obtain first encrypted transmitted information; encrypt the first encrypted transmitted information by using the verification public key, to obtain second encrypted transmitted information; and transmit the second encrypted transmitted information to the server.

The embodiments of the key filling system and the key filling method provided in the above embodiments belong to the same concept. For the specific implementation process, reference may be made to the method embodiments, and details are not described herein again.

Through the technical solutions provided in the embodiments of this application, a verification public key generated by a server can be filled into a security chip, so that the security chip encrypts information by using the verification public key. In this way, in a process of key filling, the transmission of private keys is not involved at all, thereby reducing the risk of leakage of the private keys and improving the security of the information.

Figure 7:
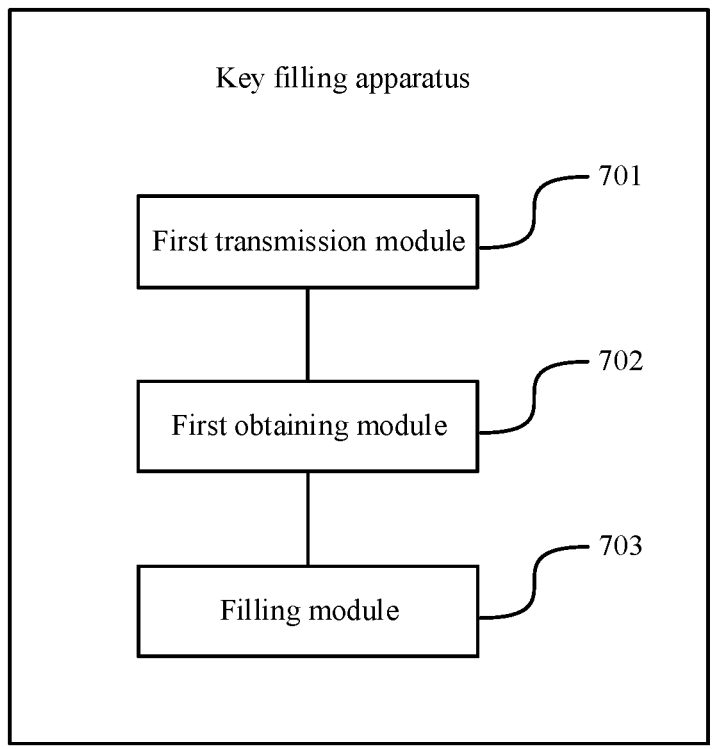
FIG. 7 is a schematic structural diagram of a key filling apparatus according to an embodiment of this application.

FIG. 7 is a schematic structural diagram of a key filling apparatus according to an embodiment of this application. Referring to FIG. 7, the apparatus includes: a first transmission module 701, a first obtaining module 702, and a filling module 703.

The first transmission module 701 is configured to transmit first filling information to a server, the first filling information being used for indicating a filling permission of the electronic device to a security chip.

The first obtaining module 702 is configured to obtain second filling information, the second filling information including a verification public key generated by the server, in accordance with a determination that the electronic device has the filling permission to the security chip based on the first filling information, transmitting, by the server, the second filling information to the electronic device.

The filling module 703 is configured to fill the verification public key into the security chip, the verification public key being used for encrypting information, and a verification private key corresponding to the verification public key being used for decrypting the encrypted information.

In a possible implementation, the first transmission module 701 is configured to encrypt the first filling information by using an electronic device private key of the electronic device, to obtain first encrypted information; and transmit the first encrypted information to the server.

In a possible implementation, the first transmission module 701 is configured to map the first filling information to a first information digest corresponding to the first filling information; and encrypt the first information digest and the first filling information by using the electronic device private key, to obtain the first encrypted information.

In a possible implementation, the first obtaining module 702 is configured to obtain second encrypted information transmitted by the server, where the second encrypted information is obtained by the server encrypting the second filling information by using a server private key of the server; and decrypt the second encrypted information by using a server public key, to obtain the second filling information, where the server public key corresponds to the server private key.

The above functional modules are only described for exemplary purposes when the key filling apparatus provided in the foregoing embodiments generates a terminal key. In actual applications, the functions may be allocated to different functional modules according to specific needs, which means that the internal structure of the electronic device is divided to different functional modules to complete all or some of the above described functions. In addition, the embodiments of the key filling apparatus and the key filling method provided in the above embodiments belong to the same concept. For the specific implementation process, reference may be made to the method embodiments, and details are not described herein again.

Through the technical solutions provided in the embodiments of this application, a verification public key generated by a server can be filled into a security chip, so that the security chip encrypts information by using the verification public key. In this way, in a process of key filling, the transmission of private keys is not involved at all, thereby reducing the risk of leakage of the private keys and improving the security of the information.

Figure 8:
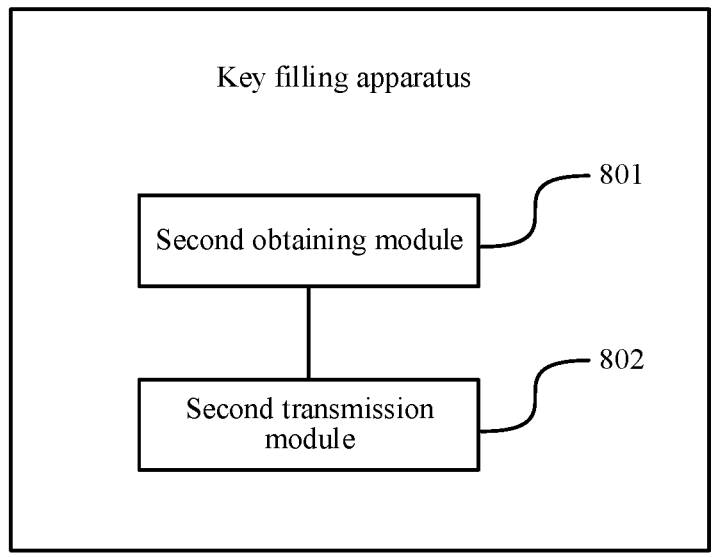
FIG. 8 is a schematic structural diagram of a key filling apparatus according to an embodiment of this application.

FIG. 8 is a schematic structural diagram of a key filling apparatus according to an embodiment of this application. Referring to FIG. 8, the apparatus includes: a second obtaining module 801 and a second transmission module 802.

The second obtaining module 801 is configured to obtain first filling information transmitted by an electronic device, the first filling information being used for indicating a filling permission of the electronic device to a security chip.

The second transmission module 802 is configured to transmit second filling information to the electronic device in response to the electronic device having the filling permission to the security chip, the second filling information including a verification public key generated by the server so that the electronic device fills the verification public key into the security chip, the verification public key being used for encrypting information, and a verification private key corresponding to the verification public key being used for decrypting the encrypted information.

In a possible implementation, the second obtaining module 801 is configured to obtain first encrypted information transmitted by the electronic device, where the first encrypted information is obtained by the electronic device encrypting the first filling information by using an electronic device private key of the electronic device; and decrypt the first encrypted information by using an electronic device public key, to obtain the first filling information, where the electronic device public key corresponds to the electronic device private key.

In a possible implementation, the first filling information includes a chip public key of the security chip, and the apparatus further includes:
  a first encryption module, configured to encrypt generated verification information by using the chip public key and the verification private key, to obtain a first authentication code;
  the second transmission module 802, further configured to transmit the first authentication code to the security chip, so that the security chip decrypts the first authentication code by using a chip private key of the security chip and the verification public key, to obtain first information;
  the second obtaining module 801, further configured to obtain a second authentication code, where the second authentication code is an authentication code obtained by the security chip encrypting the first information by using the verification public key and the chip private key; and
  a fourth transmission module, configured to transmit, in response to the first information in the second authentication code being the same as the verification information, verification success information of the security chip to the electronic device.

In a possible implementation, the first encryption module is configured to encrypt the verification information by using the chip public key, to obtain a first verification code; and encrypt the first verification code by using the verification private key, to obtain the first authentication code.

In a possible implementation, a third obtaining module is configured to receive third encrypted information, where the third encrypted information is encrypted information obtained by the electronic device encrypting the second authentication code by using an electronic device private key of the electronic device; and decrypt the third encrypted information by using an electronic device public key, to obtain the second authentication code, where the electronic device public key corresponds to the electronic device private key.

In a possible implementation, the apparatus further includes:
  a first decryption module, configured to decrypt the second authentication code by using the chip public key, to obtain a third verification code; and
  a second decryption module, configured to decrypt the third verification code by using the verification private key, to obtain the first information.

In a possible implementation, the apparatus further includes:
  the fourth transmission module, configured to transmit, in response to the first information in the second authentication code being different from the verification information, verification failure information of the security chip to the electronic device, so that the electronic device reperforms key filling on the security chip.

In a possible implementation, the second transmission module 802 is configured to encrypt the second filling information by using a server private key of the server, to obtain second encrypted information; and transmit the second encrypted information to the electronic device.

In a possible implementation, the second transmission module 802 is configured to map the second filling information to a fourth information digest corresponding to the second filling information; and encrypt the fourth information digest and the second filling information by using the server private key, to obtain the second encrypted information.

The above functional modules are only described for exemplary purposes when the key filling apparatus provided in the foregoing embodiments generates a terminal key. In actual applications, the functions may be allocated to different functional modules according to specific needs, which means that the internal structure of the server is divided to different functional modules to complete all or some of the above described functions. In addition, the embodiments of the key filling apparatus and the key filling method provided in the above embodiments belong to the same concept. For the specific implementation process, reference may be made to the method embodiments, and details are not described herein again.

Through the technical solutions provided in the embodiments of this application, a verification public key generated by a server can be filled into a security chip, so that the security chip encrypts information by using the verification public key. In this way, in a process of key filling, the transmission of private keys is not involved at all, thereby reducing the risk of leakage of the private keys and improving the security of the information.

Figure 9:
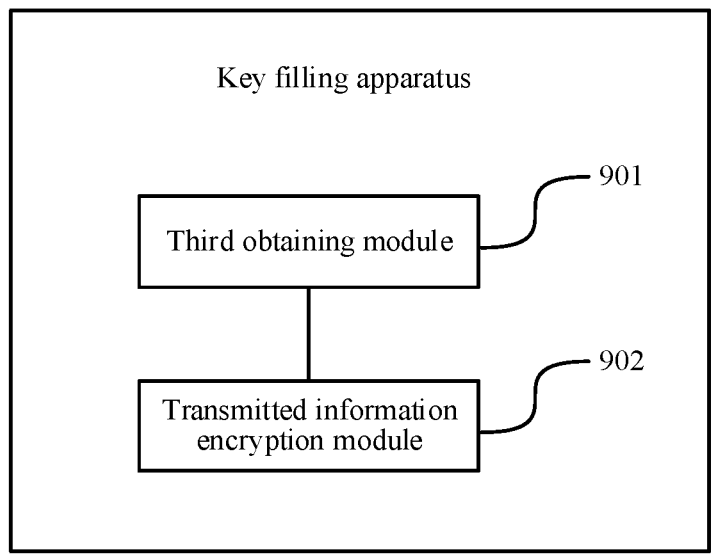
FIG. 9 is a schematic structural diagram of a key filling apparatus according to an embodiment of this application.

FIG. 9 is a schematic structural diagram of a key filling apparatus according to an embodiment of this application. Referring to FIG. 9, the apparatus includes: a third obtaining module 901 and a transmitted information encryption module 902.

The third obtaining module 901 is configured to obtain a verification public key that is filled by an electronic device into the security chip, the verification public key being generated by a server, the verification public key being used for encrypting information, and a verification private key corresponding to the verification public key being used for decrypting the encrypted information.

The transmitted information encryption module 902 is configured to encrypt transmitted information by using the verification public key.

In a possible implementation, the transmitted information encryption module 902 is configured to encrypt the transmitted information by using a chip private key, to obtain first encrypted transmitted information; and
  encrypt the first encrypted transmitted information by using the verification public key, to obtain second encrypted transmitted information.

In a possible implementation, the apparatus further includes:
  a third decryption module, configured to obtain a first authentication code, where the first authentication code is obtained by the server encrypting verification information by using a chip public key and the verification private key; and decrypt the first authentication code by using the chip private key and the verification public key, to obtain first information;
  a second encryption module, configured to encrypt the first information by using the verification public key and the chip private key, to obtain a second authentication code; and
  a third transmission module, configured to transmit the second authentication code to the server, so that the server verifies the security chip based on the first information in the second authentication code and the verification information.

In a possible implementation, the apparatus further includes:
  a generation module, configured to randomly generate a chip key pair, where the chip key pair includes the chip public key and the chip private key.

In a possible implementation, the third decryption module is configured to decrypt the first authentication code by using the verification public key, to obtain a second verification code; and decrypt the second verification code by using the chip private key, to obtain the first information.

In a possible implementation, the second encryption module is configured to encrypt the first information by using the verification public key, to obtain a third verification code; and encrypt the third verification code by using the chip private key, to obtain the second authentication code.

In a possible implementation, the transmitted information encryption module 902 is configured to encrypt the transmitted information by using the chip private key of the security chip, to obtain first encrypted transmitted information; and encrypt the first encrypted transmitted information by using the verification public key, to obtain the second encrypted transmitted information; and transmit the second encrypted transmitted information to the server.

The above functional modules are only described for exemplary purposes when the key filling apparatus provided in the foregoing embodiments generates a terminal key. In actual applications, the functions may be allocated to different functional modules according to specific needs, which means that the internal structure of the security chip is divided to different functional modules to complete all or some of the above described functions. In addition, the embodiments of the key filling apparatus and the key filling method provided in the above embodiments belong to the same concept. For the specific implementation process, reference may be made to the method embodiments, and details are not described herein again.

Through the technical solutions provided in the embodiments of this application, a verification public key generated by a server can be filled into a security chip, so that the security chip encrypts information by using the verification public key. In this way, in a process of key filling, the transmission of private keys is not involved at all, thereby reducing the risk of leakage of the private keys and improving the security of the information.

Figure 10:
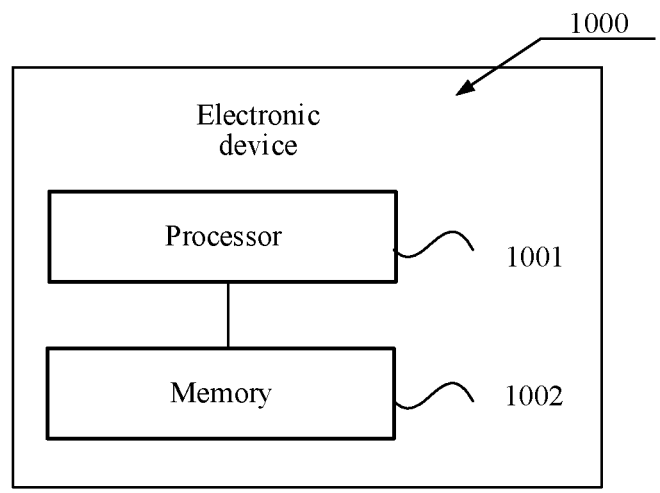
FIG. 10 is a schematic structural diagram of an electronic device according to an embodiment of this application.

FIG. 10 is a schematic structural diagram of an electronic device according to an embodiment of this application. An electronic device 1000 may be a smartphone, a tablet computer, a notebook computer or a desktop computer. The electronic device 1000 may also be referred to as other names such as user equipment, a portable electronic device, a laptop electronic device, and a desktop electronic device.

Generally, the electronic device 1000 includes one or more processors 1001 and one or more memories 1002.

The processor 1001 may include one or more processing cores, such as a 4-core processor or an 8-core processor. The processor 1001 may be implemented by using at least one hardware form of a digital signal processor (DSP), a field-programmable gate array (FPGA), and a programmable logic array (PLA). The processor 1001 may alternatively include a main processor and a coprocessor. The main processor is configured to process data in an active state, also referred to as a CPU. The coprocessor is a low-power consumption processor configured to process data in a standby state.

The memory 1002 may include one or more computer-readable storage media. The computer-readable storage media may be non-transitory. The memory 1002 may also include a high-speed random access memory, as well as non-volatile memory, such as one or more disk storage devices and flash storage devices. In some embodiments, a non-transitory computer-readable storage medium in the memory 1002 is configured to store at least one computer program, the at least one computer program being configured to be executed by the processor 1001 to implement the key filling method provided in the method embodiments of this application.

A person skilled in the art may understand that a structure shown in FIG. 10 constitutes no limitation on the electronic device 1000, and the electronic device may include more or fewer components than those shown in the figure, or some components may be combined, or a different component deployment may be used.

Figure 11:
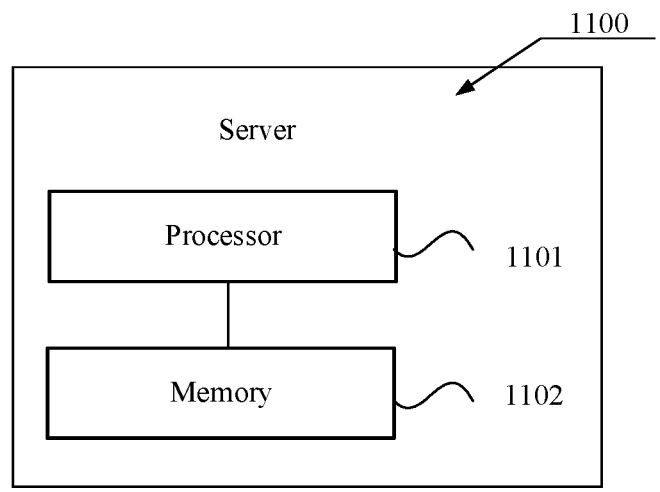
FIG. 11 is a schematic structural diagram of a server according to an embodiment of this application.

FIG. 11 is a schematic structural diagram of a server according to an embodiment of this application. The server 1100 may vary greatly due to different configurations or performance, and may include one or more central processing units (CPUs) 1101 and one or more memories 1102. The one or more memories 1102 store at least one computer program, the at least one computer program being loaded and executed by the one or more processors 1101 to implement the methods provided in the foregoing method embodiments. Certainly, the server 1100 may also have a wired or wireless network interface, a keyboard, an input/output interface and other components to facilitate input/output. The server 1100 may also include other components for implementing device functions. Details are not described herein.

In an exemplary embodiment, a computer-readable storage medium, for example, a memory including a computer program is further provided. The computer program may be executed by a processor in a terminal to implement the key filling method in the foregoing embodiments. For example, the computer-readable storage medium may be a read-only memory (ROM), a random access memory (RAM), a compact disc ROM (CD-ROM), a magnetic tape, a floppy disk, an optical data storage device, or the like.

In an exemplary embodiment, a computer program product or a computer program is further provided, including program code, the program code being stored in a computer-readable storage medium, a processor of a computer device reading the program code from the computer-readable storage medium, and the processor executing the program code, to cause the computer device to perform the key filling method.

In sum, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

Persons of ordinary skill in the art may understand that all or some of the steps of the foregoing embodiments may be implemented by using hardware, or may be implemented by a program instructing relevant hardware. The program may be stored in a computer-readable storage medium. The above-mentioned storage medium may be a read-only memory, a magnetic disk, an optical disc, or the like.

The foregoing descriptions are merely embodiments of this application, but are not intended to limit this application. Any modification, equivalent replacement, or improvement made within the spirit and principle of this application shall fall within the protection scope of this application.

What is claimed is:

1. A key filling method, performed by a server, the method comprising:
obtaining first filling information transmitted by an electronic device, wherein the first filling information indicates a filling permission to a security chip of the electronic device, the first filling information comprises a chip public key of the security chip;
in accordance with a determination that the electronic device has the filling permission: transmitting second filling information comprising a verification public key generated by the server to the electronic device, wherein the electronic device fills the verification public key into the security chip, the verification public key is used for encrypting information, and a verification private key corresponding to the verification public key is used for decrypting encrypted information;
encrypting generated verification information using the chip public key and the verification private key to obtain a first authentication code;
transmitting the first authentication code to the security chip, wherein the security chip decrypts the first authentication code using a chip private key and the verification public key to obtain first information;
obtaining a second authentication code from the security chip by encrypting the first information using the verification public key and the chip private key; and
in accordance with a determination that the first information in the second authentication code matches the verification information, transmitting verification success information of the security chip to the electronic device.

2. The method according to claim 1, wherein obtaining information transmitted by an electronic device comprises:
obtaining first encrypted information transmitted by the electronic device, wherein the first encrypted information comprises the first filling information encrypted by the electronic device using an electronic device private key; and
decrypting the first encrypted information using an electronic device public key to obtain the first filling information, wherein the electronic device public key corresponds to the electronic device private key.

3. The method according to claim 1, wherein encrypting the generated verification information to obtain a first authentication code comprises:
encrypting the verification information using the chip public key to obtain a first verification code; and
encrypting the first verification code using the verification private key to obtain the first authentication code.

4. The method according to claim 1, wherein obtaining the second authentication code comprises:
receiving third encrypted information comprising the second authentication code encrypted by the electronic device using an electronic device private key of the electronic device; and
decrypting the third encrypted information using an electronic device public key to obtain the second authentication code, wherein the electronic device public key corresponds to the electronic device private key.

5. The method according to claim 1, wherein before transmitting the verification success information of the security chip to the electronic device, the method further comprises:
decrypting the second authentication code using the chip public key to obtain a third verification code; and
decrypting the third verification code using the verification private key to obtain the first information.

6. The method according to claim 1, further comprising:
in accordance with a determination that the first information in the second authentication code is different from the verification information, transmitting verification failure information of the security chip to the electronic device to cause the electronic device to reperform key filling on the security chip.

7. The method according to claim 1, wherein transmitting the second filling information to the electronic device comprises:
encrypting the second filling information using a server private key to obtain second encrypted information; and transmitting the second encrypted information to the electronic device.

8. The method according to claim 7, wherein encrypting the second filling information using the server private key comprises:
mapping the second filling information to a fourth information digest corresponding to the second filling information; and
encrypting the fourth information digest and the second filling information using the server private key to obtain the second encrypted information.

9. An electronic device, comprising:
one or more processors; and
memory storing one or more programs, the one or more programs comprising instructions that, when executed by the one or more processors, cause the one or more processors to perform operations comprising:
obtaining first filling information transmitted by an electronic device, wherein the first filling information indicates a filling permission to a security chip of the electronic device, the first filling information comprises a chip public key of the security chip;
in accordance with a determination that the electronic device has the filling permission: transmitting second filling information comprising a verification public key generated by the server to the electronic device, wherein the electronic device fills the verification public key into the security chip, the verification public key is used for encrypting information, and a verification private key corresponding to the verification public key is used for decrypting encrypted information;
encrypting generated verification information using the chip public key and the verification private key to obtain a first authentication code;
transmitting the first authentication code to the security chip, wherein the security chip decrypts the first authentication code using a chip private key and the verification public key to obtain first information;
obtaining a second authentication code from the security chip by encrypting the first information using the verification public key and the chip private key; and
in accordance with a determination that the first information in the second authentication code matches the verification information, transmitting verification success information of the security chip to the electronic device.

10. The electronic device according to claim 9, wherein obtaining first filling information transmitted by an electronic device comprises:
obtaining first encrypted information transmitted by the electronic device, wherein the first encrypted information comprises the first filling information encrypted by the electronic device using an electronic device private key; and
decrypting the first encrypted information using an electronic device public key to obtain the first filling information, wherein the electronic device public key corresponds to the electronic device private key.

11. The electronic device according to claim 9, wherein encrypting the generated verification information to obtain a first authentication code comprises:
encrypting the verification information using the chip public key to obtain a first verification code; and
encrypting the first verification code using the verification private key to obtain the first authentication code.

12. The electronic device according to claim 9, wherein obtaining the second authentication code comprises:

receiving third encrypted information comprising the second authentication code encrypted by the electronic device using an electronic device private key of the electronic device; and
decrypting the third encrypted information using an electronic device public key to obtain the second authentication code, wherein the electronic device public key corresponds to the electronic device private key.

13. The electronic device according to claim 9, wherein before transmitting the verification success information of the security chip to the electronic device, the instructions cause the one or more processors to perform the operations further comprising:
decrypting the second authentication code using the chip public key to obtain a third verification code; and
decrypting the third verification code using the verification private key to obtain the first information.

14. The electronic device according to claim 9 and the instructions cause the one or more processors to perform the operations further comprising:
in accordance with a determination that the first information in the second authentication code is different from the verification information, transmitting verification failure information of the security chip to the electronic device to cause the electronic device to reperform key filling on the security chip.

15. The electronic device according to claim 9, wherein transmitting the second filling information to the electronic device comprises:
encrypting the second filling information using a server private key to obtain second encrypted information; and
transmitting the second encrypted information to the electronic device.

16. The electronic device according to claim 15, wherein encrypting the second filling information using the server private key comprises:
mapping the second filling information to a fourth information digest corresponding to the second filling information; and
encrypting the fourth information digest and the second filling information using the server private key to obtain the second encrypted information.

17. A non-transitory computer-readable storage medium, storing a computer program, the computer program, when executed by one or more processors of an electronic device, cause the one or more processors to perform operations comprising:
obtaining first filling information transmitted by an electronic device, wherein the first filling information indicates a filling permission to a security chip of the electronic device, the first filling information comprises a chip public key of the security chip;
in accordance with a determination that the electronic device has the filling permission: transmitting second filling information comprising a verification public key generated by the server to the electronic device, wherein the electronic device fills the verification public key into the security chip, the verification public key is used for encrypting information, and a verification private key corresponding to the verification public key is used for decrypting encrypted information;
encrypting generated verification information using the chip public key and the verification private key to obtain a first authentication code;
transmitting the first authentication code to the security chip, wherein the security chip decrypts the first authentication code using a chip private key and the verification public key to obtain first information;

obtaining a second authentication code from the security chip by encrypting the first information using the verification public key and the chip private key; and in accordance with a determination that the first information in the second authentication code matches the verification information, transmitting verification success information of the security chip to the electronic device.

18. The non-transitory computer-readable storage medium according to claim 17, wherein obtaining first filling information transmitted by an electronic device comprises:

obtaining first encrypted information transmitted by the electronic device, wherein the first encrypted information comprises the first filling information encrypted by the electronic device using an electronic device private key; and decrypting the first encrypted information using an electronic device public key to obtain the first filling information, wherein the electronic device public key corresponds to the electronic device private key.

19. The non-transitory computer-readable storage medium according to claim 17, wherein the operations further comprise:

in accordance with a determination that the first information in the second authentication code is different from the verification information, transmitting verification failure information of the security chip to the electronic device to cause the electronic device to reperform key filling on the security chip.

20. The non-transitory computer-readable storage medium according to claim 17, wherein transmitting the second filling information to the electronic device comprises:

encrypting the second filling information using a server private key to obtain second encrypted information; and transmitting the second encrypted information to the electronic device.

* * * * *